United States Patent
Saigal et al.

(10) Patent No.: US 12,093,971 B2
(45) Date of Patent: Sep. 17, 2024

(54) FLOW DATA PREDICTION AND ABNORMALITY DETECTION

(71) Applicant: The Regents of the University of Michigan, Ann Arbor, MI (US)

(72) Inventors: Romesh Saigal, Ann Arbor, MI (US); Abdullah O. AlShelahi, Glen Mills, PA (US); Ben Wang, Ann Arbor, MI (US); Jeffrey Stephen Choy, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 17/462,430

(22) Filed: Aug. 31, 2021

(65) Prior Publication Data

US 2022/0067759 A1 Mar. 3, 2022

Related U.S. Application Data

(60) Provisional application No. 63/072,644, filed on Aug. 31, 2020.

(51) Int. Cl.
*G06Q 30/02* (2023.01)
*G06N 3/04* (2023.01)
(Continued)

(52) U.S. Cl.
CPC ......... *G06Q 30/0202* (2013.01); *G06N 3/044* (2023.01); *G06Q 40/04* (2013.01)

(58) Field of Classification Search
CPC .................................................. G06Q 30/0202
See application file for complete search history.

(56) References Cited

U.S. PATENT DOCUMENTS

2020/0312430 A1* 10/2020 Thomas ................. G16H 40/20
2021/0125073 A1* 4/2021 Keng ....................... G06N 3/08

FOREIGN PATENT DOCUMENTS

| CN | 10723015 | * 10/2017 | |
| CN | 107230150 | * 10/2017 | ............. G06Q 40/04 |

OTHER PUBLICATIONS

Yeung, et al., in "Jump detection in financial time series using machine learning algorithms," from Soft Computing (2020), (Year: 2019).*

(Continued)

*Primary Examiner* — Olabode Akintola
*Assistant Examiner* — Brandon M Duck
(74) *Attorney, Agent, or Firm* — Lempia Summerfield Katz LLC

(57) ABSTRACT

A method for detecting an abnormality in a flow system includes obtaining, with a processor, input flow data for the flow system over a series of time intervals, sequentially processing, with the processor, the input flow data to generate, for each time interval in the series of time intervals, flow feature data, the flow feature data being representative of a plurality of flow parameters for the input flow data at the time interval in the series of time intervals, applying, with the processor, the flow feature data to a machine learning tool, the machine learning tool being configured to provide an assessment, for each time interval in the series of time intervals, of whether the input flow data is indicative of the abnormality being present in a following time interval in the series of time intervals, and providing, with the processor, output data indicative of the assessment.

24 Claims, 17 Drawing Sheets

(51) Int. Cl.
G06N 3/044 (2023.01)
G06Q 30/0202 (2023.01)
G06Q 40/04 (2012.01)

(56) References Cited

OTHER PUBLICATIONS

Simon J Julier and Jeffrey K Uhlmann; New extension of the kalman filter to nonlinear systems. In Signal processing, sensor fusion, and target recognition VI, Proceedings vol. 3068, pp. 182-193; 1997.
A. AlShelahi and R. Saigal; Insights into the macroscopic behavior of equity markets: Theory and application; Physica A: Statistical Mechanics and its Applications, vol. 505; pp. 778-793, 2018.
A. Bagnall, J. Lines, A. Bostrom, J. Large, and E. Keogh; The great time series classification bake off: a review and experimental evaluation of recent algorithmic advances; Data Mining and Knowledge Discovery, vol. 31(3); pp. 606-660, 2017.
A. Deihimi and H. Showkati; Application of echo state networks in short-term electric load forecasting; Energy, vol. 39 (1); pp. 327-340, 2012.
A. Graves and J. Schmidhuber; Framewise phoneme classification with bidirectional LSTM and other neural network architectures; Neural Networks, vol. 18(5-6); pp. 602-610, 2005.
A. Kampouraki, G. Manis, and C. Nikou; Heartbeat time series classification with support vector machines; IEEE Trans. Information Technology in Biomedicine, vol. 13(4); pp. 512-518, 2009.
A. Prater; Spatiotemporal signal classification via principal components of reservoir states; Neural Networks, vol. 91, 2017; 16 pp.
A. Rodan, A. F. Sheta, and H. Faris; Bidirectional reservoir networks trained using svm + privileged information for manufacturing process modeling; Soft Computing, vol. 21(22); pp. 6811-6824, 2017.
Angeliki Ermogenous; Brownian Motion and its Applications in the Stock Market; In Undergraduate Mathematics Day, Electronic Proceedings; University of Dayton eCommons, 2006; 10 pp.
Armand Joulin et al.; Stock price jumps: news and vol. play a minor role; arXiv Statistical Finance; preprint arXiv:0803.1769, 2008; 14 pp.
B. Vasicek, D. Zigraiova, M. Hoeberichts, R. Vermeulen, K. Smidkova, and J. de Haan; Leading indicators of financial stress: New evidence; Journal of Financial Stability, vol. 28; pp. 240-257, 2017.
Craig H Bishop, Brian J Etherton, and Sharanya J Majumdar; Adaptive sampling with the ensemble transform kalman filter. Part I: Theoretical aspects; Monthly weather review, vol. 129(3); pp. 420-436, 2001.
D. Faranda, F. M. E. Pons, E. Giachino, S. Vaienti, and B. Dubrulle; Early warnings indicators of financial crises via auto regressive moving average models; Communications in Nonlinear Science and Numerical Simulation, vol. 29 (1-3); pp. 233-239, 2015.
D. P. Hunt and D. Parry; Using echo state networks to classify unscripted, real-world punctual activity; Engineering Applications of Neural Networks, pp. 369-378; Springer, 2015.
David Easley, Marcos M Lopez De Prado, and Maureen O'Hara; The microstructure of the "flash crash": Flow toxicity, liquidity crashes, and the probability of informed trading; Journal of Portfolio Management, vol. 37; pp. 118-128, 2011.
E. P. Carden and J. M. Brownjohn; Arma modelled time-series classification for structural health monitoring of civil Infrastructure; Mechanical systems and signal processing, vol. 22; pp. 295-314, 2008.
E. Trentin, S. Scherer, and F. Schwenker; Emotion recognition from speech signals via a probabilistic echo-state network; Pattern Recognition Letters, vol. 66; 2015; 9 pp.
E. W. Ngai, Y. Hu, Y. Wong, Y. Chen, and X. Sun; The application of data mining techniques in financial fraud detection: A classification framework and an academic review of literature; Decision support systems, vol. 50(3); pp. 559-569, 2011.

Eric A Wan and Rudolph Van Der Merwe; The unscented kalman filter for nonlinear estimation; In Adaptive Systems for Signal Processing, Communications, and Control Symposium 2000; The IEEE 2000, pp. 153-158; 2000.
F. A. Gers, J. Schmidhuber, and F. Cummins; Learning to forget: Continual prediction with LSTM; Neural Computation, vol. 12(10); pp. 2451-2471, 2000.
F. J. Provost, T. Fawcett; Analysis and visualization of classifier performance: Comparison under imprecise class and cost distributions. KDD Proceedings, vol. 97, pp. 43-48, 1997.
F. M. Bianchi, E. De Santis, A. Rizzi, and A. Sadeghian; Short-term electric load forecasting using echo state networks and PCA decomposition; IEEE Access, vol. 3, 2015, 13 pp.
G. M. Weiss; Mining with rarity: a unifying framework; ACM Sigkdd Explorations Newsletter, vol. 6(1); 7-19, 2004.
G. W. Schwert. Anomalies and market efficiency. Handbook of the Economics of Finance, Chapter 15; pp. 939-974, 2003.
Geir Evensen; Sequential data assimilation with a nonlinear quasi-geostrophic model using monte carlo methods to forecast error statistics; Journal of Geophysical Research; vol. 99(C5); pp. 10143-10162, 1994.
Gerrit Burgers, Peter Jan van Leeuwen, and Geir Evensen; Analysis scheme in the ensemble kalman filter; Monthly weather review, 126(6); pp. 1719-1724, 1998.
H. Chen, F. Tang, P. Tino, and X. Yao; Model-based kernel for efficient time series analysis; Proceedings of the 19th ACM SIGKDD international conference on Knowledge discovery and data mining, 2013; 10 pp.
H. He and E. A. Garcia; Learning from imbalanced data; IEEE Transactions on Knowledge & Data Engineering, vol. 21 (9); pp. 1263-1284, 2009.
H. Jaeger; The echo state approach to analysing and training recurrent neural networks-with an erratum note; German National Research Center for Information Technology GMD Technical Report, vol. 148(34); 2001; 46 pp.
J. Dopke, U. Fritsche, and C. Pierdzioch; Predicting recessions with boosted regression trees; International Journal of Forecasting, vol. 33(4); pp. 745-759, 2017.
J. Pathak, A. Wikner, R. Fussell, S. Chandra, B. R. Hunt, M. Girvan, and E. Ott; Hybrid forecasting of chaotic processes: using machine learning in conjunction with a knowledge-based model; Chaos: An Interdisciplinary Journal of Nonlinear Science, vol. 28(4); 2018; 9 pp.
J. Pathak, B. Hunt, M. Girvan, Z. Lu, and E. Ott; Model-free prediction of large spatiotemporally chaotic systems from data: a reservoir computing approach; Physical review letters, vol. 120(2), 2018; 5 pp.
Jean-Philippe Bouchaud; The endogenous dynamics of markets: price impact and feedback loops; arXiv preprint arXiv:1009.2928, 2010.
Jing Lei, Peter Bickel, and Chris Snyder; Comparison of ensemble kalman filters under non-gaussianity; Monthly Weather Review, vol. 138(4); pp. 1293-1306, 2010.
K. Doya; Bifurcations in the learning of recurrent neural networks; 1992 IEEE International Symposium on Circuits and Systems, vol. 6, pp. 2777-2780; 1992.
K.-I. Funahashi and Y. Nakamura; Approximation of dynamical systems by continuous time recurrent neural network; Neural networks, vol. 6(6); pp. 801-806, 1993.
L. Grigoryeva, J. Henriques, L. Larger, and J.-P. Ortega; Optimal nonlinear information processing capacity in delay-based reservoir computers; Scientific reports, vol. 5, 2015; 11 pp.
M. A. Maloof; Learning when data sets are imbalanced and when costs are unequal and unknown; ICML-2003 workshop on learning from imbalanced data sets II, 2003; 8 pp.
M. C. Soriano, D. Brunner, M. Escalona-Moran, C. R. Mirasso, and I. Fischer; Minimal approach to neuro-inspired Information processing; Frontiers in computational neuroscience, vol. 9; 2015; 11 pp.
M. Lukosevicius and H. Jaeger; Reservoir computing approaches to recurrent neural network training; Computer Science Review, vol. 3; pp. 127-149, 2009.

(56) References Cited

OTHER PUBLICATIONS

Matthias Katzfuss, Jonathan R Stroud, and Christopher K Wikle; Understanding the ensemble kalman filter; The American Statistician, vol. 70(4); pp. 350-357, 2016.

Michael K Tippett et al.; Ensemble square root filters; Monthly Weather Review, vol. 131(7); pp. 1485-1490, 2003.

N. V. Chawla, N. Japkowicz, and A. Kotcz; Special issue on learning from imbalanced data sets; ACM Sigkdd Explorations Newsletter, vol. 6(1); pp. 1-6, 2004.

Neil Johnson et al.; Abrupt rise of new machine ecology beyond human response time; Scientific reports, vol. 3, 2013; 7 pp.

O. Linton and S. Mahmoodzadeh; Implications of high-frequency trading for security markets; Annual Review of Economics, vol. 10, 2018; pp. 237-259.

P. Buteneers et al.; Real-time detection of epileptic seizures in animal models using reservoir computing; Epilepsy research, vol. 103(2-3); pp. 124-134, 2013.

P. K. Jain; Financial market design and the equity premium: Electronic versus floor trading; The Journal of Finance, vol. 60(6); pp. 2955-2985, 2005.

P. Tanisaro and G. Heidemann; Time series classification using time warping invariant echo state networks; 2016 15th IEEE International Conference on Machine Learning and Applications (ICMLA); pp. 831-836. IEEE, 2016.

Peter D Lax; Hyperbolic systems of conservation laws and the mathematical theory of shock waves, vol. 11; SIAM, 1973; 48 pp.

Q. Ma, L. Shen, W. Chen, J. Wang, J. Wei, and Z. Yu; Functional echo state network for time series classification; Information Sciences, vol. 373; pp. 1-20, 2016.

R. Campos, J. McCrank; Minute by minute, Nasdaq chaos engulfed Facebook IPO, Reuters; 2012; 9 pp.

R. E. Farmer; The stock market crash of 2008 caused the great recession: Theory and evidence; Journal of Economic Dynamics and Control, vol. 36(5); pp. 693-707, 2012.

R. J. Barro and J. F. Ursua; Stock-market crashes and depressions; Technical report, National Bureau of Economic Research, 2009; 36 pp.

R. Saigal and A. AlShelahi; Predicting the next stock market 'flash crash'; The Conversation; 2019; 5 pp.

Randall J LeVeque; Conservative methods for nonlinear problems; In Numerical Methods for Conservation Laws, pp. 122-135. Springer, 1992.

Rudolph Emil Kalman; A new approach to linear filtering and prediction problems; Transactions of the ASME-Journal of Basic Engineering, vol. 82(Series D); pp. 35-45, 1960.

S. H. Khan, M. Hayat, M. Bennamoun, F. A. Sohel and R. Togneri; Cost-Sensitive Learning of Deep Feature Representations From Imbalanced Data; IEEE Transactions on Neural Networks and Learning Systems, vol. 29, No. 3, 2018; 15 pp.

S. Scardapane and D. Wang; Randomness in neural networks: an overview; Wiley Interdisciplinary Reviews: Data Mining and Knowledge Discovery, vol. 7(2), 2017; 18 pp.

Vladimir Filimonov and Didier Sornette; Quantifying reflexivity in financial markets: Toward a prediction of flash crashes; Physical Review E, vol. 85(5); 2012; 9 pp.

W Gregory Lawson and James A Hansen; Implications of stochastic and deterministic filters as ensemble-based data assimilation methods in varying regimes of error growth; Monthly weather review, vol. 132(8); pp. 1966-1981, 2004.

W. Aswolinskiy, R. F. Reinhart, and J. Steil; Time series classification in reservoir- and model-space: a comparison; 7th IAPR Workshop on Artificial Neural Networks in Pattern Recognition, pp. 197-208; Springer, 2016.

W. Maass, T. Natschlager, and H. Markram; Real-time computing without stable states: A new framework for neural computation based on perturbations; Neural computation, vol. 14(11); pp. 2531-2560, 2002.

X. Dutoit et al.; Pruning and regularization in reservoir computing; Neurocomputing, vol. 72(7-9); pp. 1534-1546, 2009.

Y. Bengio, P. Simard, and P. Frasconi; Learning long-term dependencies with gradient descent is difficult; IEEE transactions on neural networks, vol. 5(2); pp. 157-166, 1994.

Y. Sun, M. S. Kamel, A. K. Wong, and Y. Wang; Cost-sensitive boosting for classification of imbalanced data; Pattern Recognition, vol. 40(12); pp. 3358-3378, 2007.

Z. Lu, J. Pathak, B. Hunt, M. Girvan, R. Brockett, and E. Ott; Reservoir observers: Model-free inference of unmeasured variables in chaotic systems; Chaos: An Interdisciplinary Journal of Nonlinear Science, vol. 27(4); 2017; 8 pp.

Z. Shi and M. Han; Support vector echo-state machine for chaotic time-series prediction; IEEE Trans. Neural Networks, vol. 18(2); pp. 359-372, 2007.

Z.-H. Zhou and X.-Y. Liu; Training cost-sensitive neural networks with methods addressing the class imbalance problem; IEEE Transactions on Knowledge and Data Engineering, vol. 18(1); 63-77, 2006.

\* cited by examiner

FLOW DATA PREDICTION AND ABNORMALITY DETECTION

CROSS-REFERENCE TO RELATED APPLICATION

This application claims the benefit of U.S. provisional application entitled "Flow Data Prediction and Abnormality Detection," filed Aug. 31, 2020, and assigned Ser. No. 63/072,644, the entire disclosure of which is hereby expressly incorporated by reference.

BACKGROUND OF THE DISCLOSURE

Field of the Disclosure

The disclosure relates generally to abnormality detection in flow data.

BRIEF DESCRIPTION OF RELATED TECHNOLOGY

The use of physics in finance has a long history that goes back to the 19th century when Bachelier introduced the one-dimensional random walk (Brownian Motion) in finance. After the discovery of Brownian Motion, Geometric Brownian Motion (GBM) became a useful tool to describe stock price movement. GBM-based systems analyze stock prices using drift and volatility terms. Although this analysis is useful in microscopic studies, it ignores macroscopic information concerning stock interactions.

Fluid dynamics has been used to describe macroscopic information about stocks. A macroscopic equity markets (MEM) tool has been developed. The MEM tool recognizes that stocks flow as fluid particles and describes macroscopic variables (i.e., density and flux) for its evaluation. In this tool, stocks are aggregated and macroscopic variables, such as density and average velocity, are defined. The dynamics of these macroscopic variables are described through a system of stochastic inhomogeneous partial differential equations that provide a useful representation of the market dynamics.

Algorithmic trading in the financial markets has significantly increased and replaced open outcry mechanisms. For example, high frequency algorithmic trading uses powerful and fast computers and complex algorithms to yield high returns. With the spread of these trading behaviors, new market anomalies, such as flash crashes, have emerged. Indeed, empirical studies have confirmed the impact of high frequency trading on stock prices, creating market imbalance and instabilities. Previous research on market anomalies has, primarily, focused only on those that violated the market efficiency hypothesis. Yet, in this era of fast computing, anomalies can also occur in response to complex transactions and glitches.

The existing research into predicting financial anomalies has mainly focused on major crisis forecasting. These forecasting methods include classical models and machine learning techniques. One of the classical approaches is to use macroeconomics indicators to predict financial stress. For example, Bayesian Model Averaging (BMA) has been used to identify variables with high predictive power for financial stress. Despite the success of BMA in accounting for model uncertainty, BMA was not able to provide good predictions for financial stress. Other studies have used traditional econometric models to forecast economic crises. For instance, early warning indicators were identified using a linear model known as Auto Regressing Moving Average (ARMA).

A different line of research in forecasting is the implementation of machine learning techniques. In this line of research, early detection systems were developed using state of the art machine learning techniques such as Artificial Neural Network (ANN), decision trees, and logistic regression. Tree-based machine learning techniques have also been investigated in the literature. Boosted Regression Trees (BRT) have been used to select indicators for predicting recessions, showing that the short-term interest rate and the term spread were the leading indicators.

The previous research in forecasting tools have focused on high intensity crashes. However, little research has investigated the medium intensity crashes that can occur during a given trading day.

Abnormality detection methods using machine learning techniques fall into six main categories: regression, clustering, prediction, outlier detection, visualization, and classification methods. Clustering methods don't require the data to be labeled. By employing a similarity measure, clustering aims to group similar data together. Classification methods are best suited for labeled data in which a classification model is trained to identify class boundaries. The trained model is then used to classify future instances.

Medium intensity crashes are relatively scarce compared to regular market activity, making them a underrepresented minority. This class imbalance presents a challenge for classification techniques. The imbalance hinders the ability of classification algorithms to learn the decision boundaries correctly.

SUMMARY OF THE DISCLOSURE

In accordance with one aspect of the disclosure, a method for detecting an abnormality in a flow system includes obtaining, with a processor, input flow data for the flow system over a series of time intervals, sequentially processing, with the processor, the input flow data to generate, for each time interval in the series of time intervals, flow feature data, the flow feature data being representative of a plurality of flow parameters for the input flow data at the time interval in the series of time intervals, applying, with the processor, the flow feature data to a machine learning tool, the machine learning tool being configured to provide an assessment, for each time interval in the series of time intervals, of whether the input flow data is indicative of the abnormality being present in a following time interval in the series of time intervals, and providing, with the processor, output data indicative of the assessment.

In accordance with another aspect of the disclosure, a system for detecting an abnormality in a flow system includes a memory in which flow feature extraction instructions and neural network instructions are stored, and a processor coupled to the memory. The processor is configured to obtain input flow data for the flow system over a series of time intervals. The processor is configured, via execution of the flow feature extraction instructions, to sequentially process the input flow data to generate, for each time interval in the series of time intervals, flow feature data, the flow feature data being representative of a plurality of flow parameters for the input flow data at the time interval in the series of time intervals. The processor is configured, via execution of the neural network instructions, to apply the flow feature data to a recurrent neural network, the recurrent neural network being configured to provide an assessment, for each time interval in the series of time intervals, of whether the input flow data is indicative of the abnormality being present in a following time interval in the series of time intervals.

In accordance with still another aspect of the disclosure, a method for detecting an abnormality in a flow system includes obtaining, with a processor, input flow data for the flow system over a series of time intervals, sequentially processing, with the processor, the input flow data to generate, for each time interval in the series of time intervals, flow feature data, the flow feature data being representative of a plurality of flow parameters for the input flow data at the time interval in the series of time intervals, analyzing, with the processor, the flow feature data to provide an assessment for each time interval in the series of time intervals as to whether the input flow data is indicative of the abnormality being present in a following time interval in the series of time intervals, and providing, with the processor, output data indicative of the assessment. The plurality of flow parameters comprises an external force applied to the flow system.

In connection with any one of the aforementioned aspects, the methods and/or systems described herein may alternatively or additionally include or involve any combination of one or more of the following aspects or features. The method further includes generating, with the processor, a flow state prediction for the flow system for the following time interval in the series of time intervals based on the flow feature data for each time interval in the series of time intervals. Applying the flow feature data to the machine learning tool includes applying the flow state prediction to a recurrent neural network such that the assessment is based on the flow feature data and the flow state prediction. Applying the flow feature data to the machine learning tool includes providing the flow state prediction at both input and output ends of a recurrent neural network. Generating the flow state prediction includes updating a plurality of system parameters indicative of dynamics of the flow system, the flow state prediction including data specifying the plurality of system parameters. Generating the flow state prediction includes determining future flow feature data for the flow system for the following time interval. The future flow feature data includes data indicative of flux for the following time interval and data indicative of density for the following time interval. Generating the flow state prediction includes implementing a filter configured in accordance with dynamics of the flow system. The filter is configured as a Kalman filter. The machine learning tool is configured as a cost-sensitive recurrent neural network via a plurality of weights to add weight to a minority class associated with a positive detection of the abnormality. The machine learning tool is configured as an echo state network. The plurality of flow parameters includes velocity and density. The plurality of flow parameters includes an external force applied to the flow system. Sequentially processing the input flow data includes generating energy conservation parameters for the flow system by fitting the input flow data to a conservation of energy equation. The plurality of flow parameters includes at least one of the generated energy conservation parameters. The input flow data is representative of price data for a plurality of financial products over the series of time intervals. The flow system includes a financial market such that the abnormality includes a crash in the financial market. Filter instructions are stored in the memory. The processor is configured, via execution of the filter instructions, to generate a flow state prediction for the flow system for the following time interval in the series of time intervals based on the flow feature data for each time interval in the series of time intervals. The processor is configured, via execution of the neural network instructions, to apply the flow state prediction to the recurrent neural network such that the assessment is based on the flow feature data and the flow state prediction. The processor is configured, via execution of the neural network instructions, to provide the flow state prediction at both input and output ends of the recurrent neural network. The processor is configured, via execution of the filter instructions, to update a plurality of system parameters indicative of dynamics of the flow system, the flow state prediction including data specifying the plurality of system parameters. The processor is configured, via execution of the filter instructions, to determine future flow feature data for the flow system for the following time interval. The future flow feature data includes data indicative of flux for the following time interval and data indicative of density for the following time interval. The processor is configured, via execution of the filter instructions, to implement a Kalman filter configured in accordance with dynamics of the flow system. Analyzing the flow feature data includes applying the flow feature data to a machine learning tool.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 16:
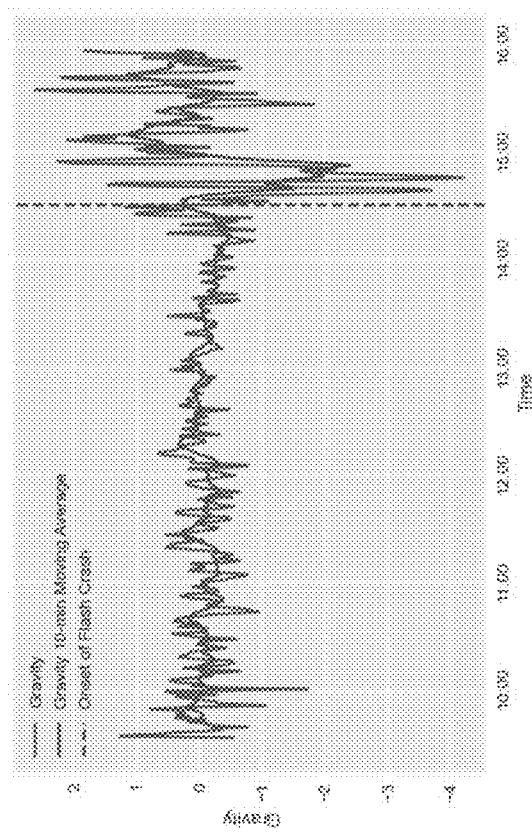
Figure 17:
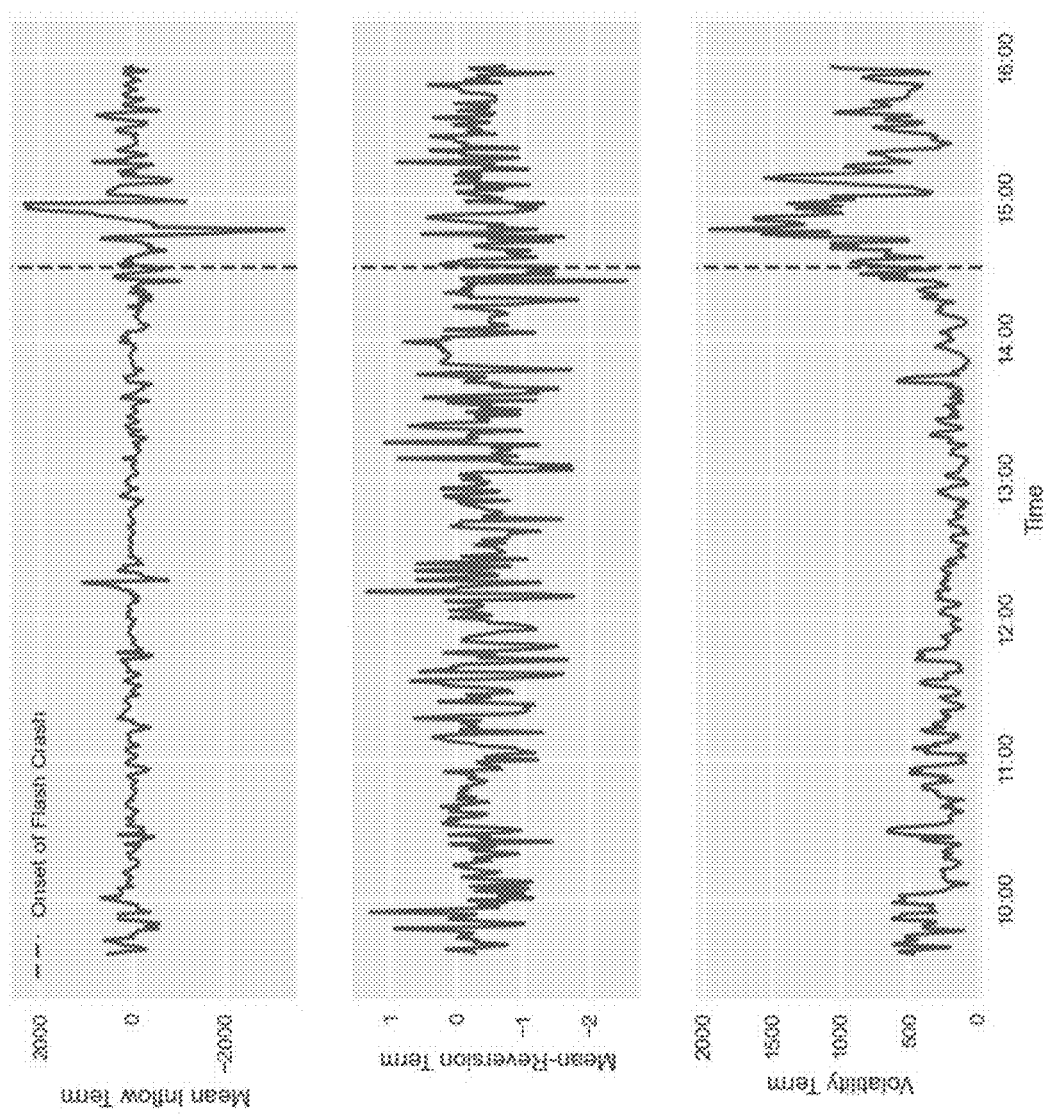

FIG. 16 is a graphical plot of flow feature data for an external force parameter generated via the disclosed methods and systems in accordance with one example and in connection with a dataset representative of another example flow system FIG. 17 depicts graphical plots of flow feature data for fitted parameters of the conservation of energy generated via the disclosed methods and systems in accordance with one example and in connection with a dataset representative of an example flow system.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Methods and systems for detecting abnormalities in a flow system are described. The abnormality detection may involve a forecast of an abnormality being present in a future time interval, such as one time interval ahead of the input flow data being processed. The disclosed methods and systems sequentially process the input flow data to generate flow feature data for flow parameters, such as the velocity and density. The flow feature data is applied to a recurrent neural network or other machine learning tool configured to provide an assessment of whether the input flow data is indicative of an abnormality. In some cases, the flow system is or otherwise includes a financial market such that abnormalities correspond with, or otherwise include, a crash in the financial market, such as a flash crash.

In some cases, the disclosed methods and systems generate a flow state prediction for the flow system based on the flow feature data. The flow state prediction may also be applied to the recurrent neural network for use in providing the assessment. As described herein, the flow state prediction may involve or include updating a plurality of system parameters indicative of the dynamics of the flow system. In some cases, the dynamics of the flow system are established via Kalman filtering. The dynamics of the flow system are then used to determine future flow feature data for the flow system. The future flow feature data and/or the system parameters may then be applied as inputs to the recurrent neural network.

As described herein, the recurrent neural network may be configured to address a class imbalance challenge presented by the abnormality detection. The class imbalance challenge involves the lower likelihood of abnormalities. The configuration of the recurrent neural network may involve or include weighting to address the class imbalance.

Although described in connection with detection of abnormalities in equity financial markets, the disclosed methods and systems may be applied to a wide variety of financial systems, markets and products. For instance, the disclosed methods and systems may be used in connection with non-equity financial markets, including bond, foreign currency exchange, and other markets and products. The disclosed methods and systems may also be used in connection with non-financial flow systems, including, for instance, gaseous fluid flows and other types of flow data exhibiting fluid flow characteristics. Still other types of non-financial flow systems to which the disclosed methods and systems may be applied include biological flow systems. For example, the disclosed methods and systems may be used to detect abnormalities in the status of a patient or other subject, e.g., during surgery, in which input flow data is provided via a number of physiological signals. One or more of the physiological signals may relate to, for instance, blood flow, respiratory activity, and/or other biological processes or features.

Although described herein in connection with recurrent neural networks, the flow feature data may be analyzed by one or more additional and/or alternative machine learning tools. For instance, the machine learning tool may be configured as a support vector machine. Still other types of machine learning tools suitable for processing input data arranged in, or otherwise including, a time series may alternatively or additionally be used.

Figure 1:
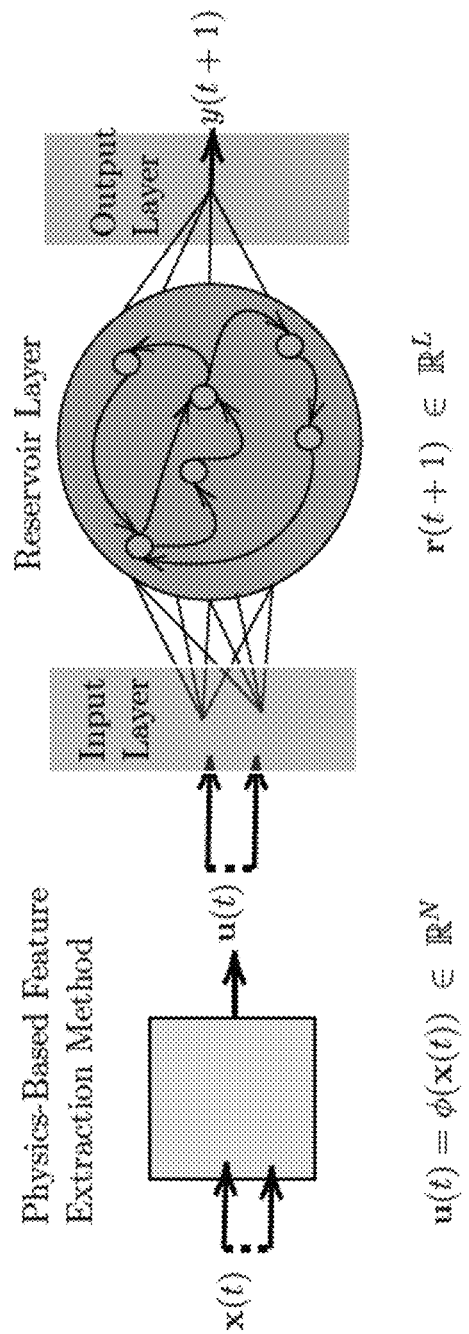
FIG. 1 is a schematic view of a system for detecting an abnormality in a flow system in accordance with one example.

FIG. 1 depicts the abnormality detection scheme of one example of the disclosed methods and systems. In this case, input flow data $x(t)$ for a series of time intervals is sequentially processed to generate, for each time interval in the series of time intervals, flow feature data $u(t)$. The flow feature data is representative of a plurality of flow parameters for the input flow data at the time interval in the series of time intervals. For example, the flow parameters may be indicative of the velocity and/or density of the input flow data at each time interval. Alternative or additional flow parameters may be generated, including, for instance, pressure, flux, energy (e.g., kinetic energy), and external forces. Further details regarding examples of the generation of flow feature data for kinetic energy, external forces applied to the flow system, and the conservation of energy in the flow system, are provided below in connection with FIGS. 14-17.

The flow feature data is applied to a recurrent neural network. Each flow parameter may thus be an input feature for the recurrent neural network. The recurrent neural network is configured to provide an assessment $y(t+1)$, for each time interval in the series of time intervals, of whether the input flow data is indicative of the abnormality being present in a following time interval $(t+1)$ in the series of time intervals. For instance, the assessment may be or include a binary output with 1 being indicative of an abnormality and 0 being indicative of the lack of an abnormality. Output data indicative of the assessment may then be provided. In the event of an abnormality, the output data may be provided in the form of an alert or alarm.

Figure 2:
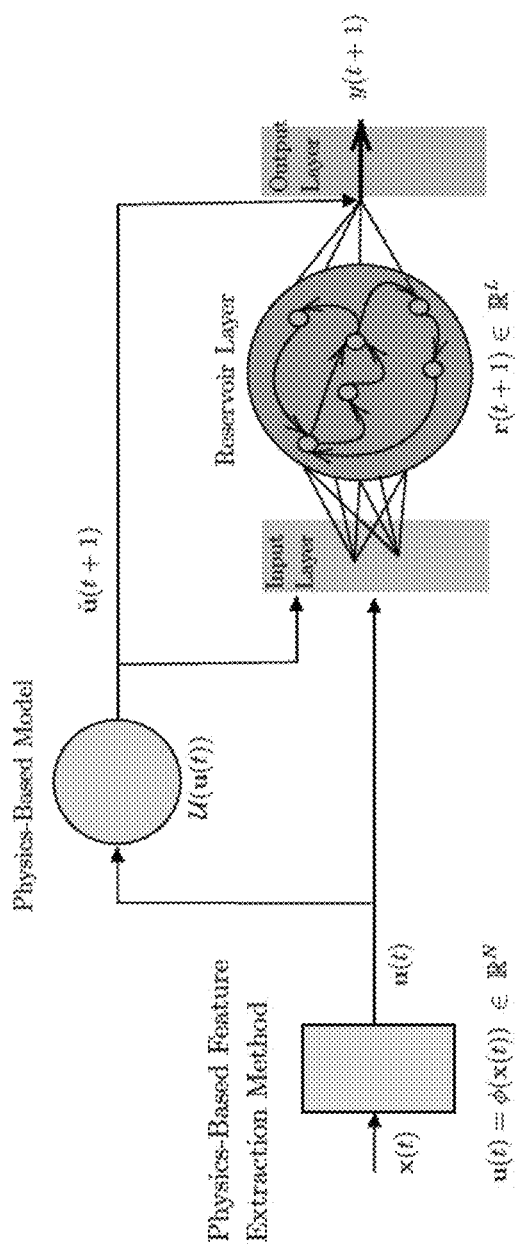
FIG. 2 is a schematic view of a system for detecting an abnormality in a flow system in accordance with another example.

FIG. 2 depicts the abnormality detection scheme of another example of the disclosed methods and systems. The input flow data is again processed to extract or otherwise generate, for each time interval in the series of time intervals, the flow feature data u(t). The flow feature data is applied to a recurrent neural network as described above. In this case, the flow feature data is also used to generate a flow state prediction û(t+1) for the flow system for the following time interval in the series of time intervals. The flow state prediction may include future flow feature data (e.g., flux, velocity, etc.) for the following time interval (e.g., t+1), and/or one or more parameters indicative of the dynamics of the flow system. Further details regarding the parameters, and the manner in which the parameters are generated, are provided hereinbelow. The flow state prediction is applied to the recurrent neural network such that the assessment is based on the flow feature data and the flow state prediction. In this example, and as shown in FIG. 2, the flow state prediction is provided to the recurrent neural network at both input and output ends of the recurrent neural network. As described below, the flow state prediction may be generated using a Kalman filter.

Figure 3:
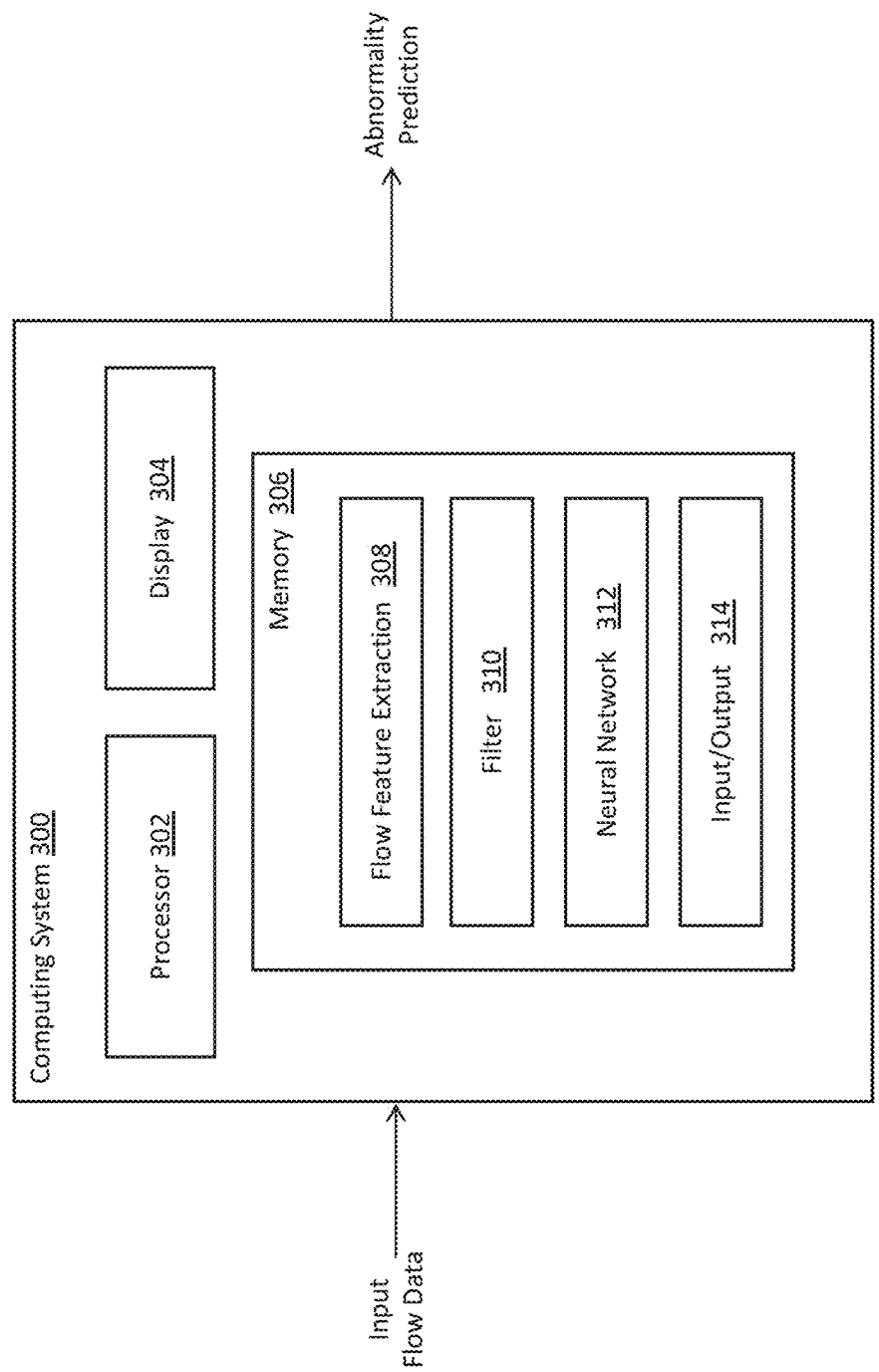
FIG. 3 is a block diagram of a system for detecting an abnormality in a flow system in accordance with another example.

FIG. 3 depicts a system 300 for detecting abnormalities in a flow system in accordance with one example. The system 300 may implement the abnormality detection scheme of FIG. 1, the abnormality detection scheme of FIG. 2, or another abnormality detection scheme, such as a combination thereof. The system 300 may alternatively be used to implement one of the methods described herein.

The system 300 includes a processor 302, a display 304 and/or other output device, and a memory 306. In this example, the memory 306 includes flow feature extraction instructions 308, filter instructions 310, neural network instructions 312, and input/output instructions 314. Execution of the flow feature extraction instructions 308 by the processor 302 may configure the processor 302 to process input flow data to generate the flow feature data. Execution of the filter instructions 310 by the processor 302 may configure the processor 302 to generate the flow state prediction. Execution of the neural network instructions 312 by the processor 302 may configure the processor 302 to apply the flow feature data and, in some cases, the flow state prediction to a neural network (e.g., a recurrent neural network). The neural network instructions may be alternatively or additionally configured to apply the flow feature data to other machine learning tools. Data indicative of the neural network and/or other machine learning tool may be integrated with the neural network instructions 312 and/or stored separately in the memory 306 and/or another storage device or other memory of the system 300. Execution of the input/output instructions 314 by the processor 302 may configure the processor 302 to obtain the input flow data and/or provide data indicative of an abnormality prediction or other assessment or output, such as an alarm or alert of an abnormality.

Figure 4:
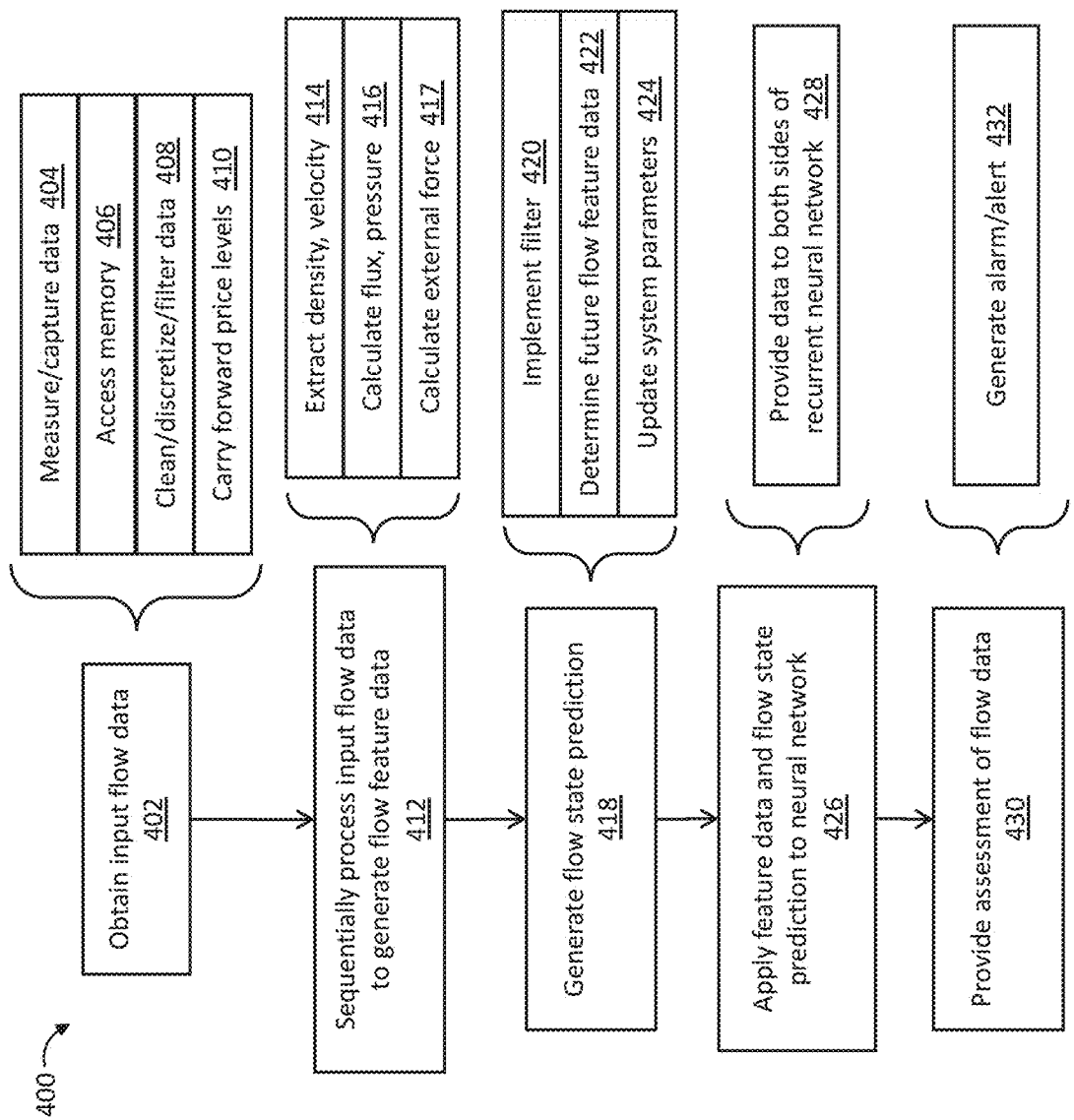
FIG. 4 is a flow diagram of a method a system for detecting an abnormality in a flow system in accordance with one example.

FIG. 4 depicts a method 400 for detecting abnormalities in a flow system in accordance with one example. The method 400 may be implemented by the processor 302 or the system 300 of FIG. 3 and/or another processor or system. The method 300 may include one or more fewer, additional, or alternative acts. For example, the method 300 may not include acts related to generating a flow state prediction in some cases.

Input flow data for the flow system over a series of time intervals is obtained in an act 402. In some cases, the input flow data is measured or otherwise captured in an act 404. Alternatively or additionally, the input flow data is obtained by accessing a memory in an act 406.

The act 402 may include one or more acts in which the input flow data is pre-processed. For example, the input flow data may be cleaned, discretized, and/or filtered in an act 408. Further details regarding such pre-processing are provided below in connection with one or more examples.

In some cases, the input flow data is representative of price data for a plurality of financial products over the series of time intervals. In those and other cases, the flow system may correspond with, or otherwise include, a financial market, in which case the abnormality to be detected may involve or otherwise include a crash in the financial market. In these market-based cases, the act 402 may include an act 410 in which price levels are carried forward to generate some of the input flow data. In other cases, the input flow data is representative of other types of flows, such as fluid flows.

In act 412, the input flow data is sequentially processed to generate, for each time interval in the series of time intervals, flow feature data, the flow feature data being representative of a plurality of flow parameters for the input flow data at the time interval in the series of time intervals. In some cases, the plurality of flow parameters include velocity and density. Additional or alternative parameters may be generated. The act 412 may include extracting the parameters from the input flow data in the manner described in AlShelahi et al., "Insights into the macroscopic behavior or equity markets: Theory and application," Physica A 505, pp. 778-793 (2018), the entire disclosure of which is hereby incorporated by reference. Alternatively or additionally, other parameters may be calculated in an act 416 based on the extracted parameters, including, for instance, flux and pressure. In this example, an external force applied to the flow system may be calculated as yet another flow parameter in an act 417. The act 412 may alternatively or additionally include generating energy conservation parameters for the flow system by fitting the input flow data to a conservation of energy equation. The plurality of flow parameters may then include one or more of the energy conservation parameters. Further details regarding examples of the calculation of the flow feature data corresponding with the external force(s) applied to the flow system and/or the fitted energy conservation parameters are set forth below in connection with FIGS. 14-17.

For example, the velocity and density ρ(x,t) (e.g., the number of stocks per unit price) may be determined via the following relationships.

$$v_k(t) = \lim_{\Delta t \to 0} \frac{p_k(t) - n_k(i - \Delta t)}{\Delta t}$$

$$N(x, t) = \int_{x_1}^{x_2} \rho(x, t) dx$$

where $p_j(t)$ is the price of stock j at time t and N(x,t) is the total number of stocks in a section $[x_1, x_1+\Delta x$ (or $x_2)]$ at time t. Other parameters may be calculated from the extracted velocity and density. For example, the flux Q(x,t) and pressure may be calculated as follows.

$$Q(x, t) = \rho(x, t)v(x, t) = \frac{\text{Number of stocks (\#)}}{\text{unit price}} \frac{\text{Average change in stock prices (\$)}}{\text{unit time}}$$

$$= \frac{\text{Change in money}}{\text{unit price unit time}}.$$

$$\text{Pressure}(x, t) = \alpha Q(x, t) v(x, t),$$

Further details regarding the extraction, calculation, or other generation of such flow parameters is provided below and in the above-referenced disclosure.

A flow state prediction may be generated in an act 418 for the flow system for the following time interval in the series of time intervals based on the flow feature data for each time interval in the series of time intervals. In some cases, the act 418 includes an act 420 in which a filter configured in accordance with dynamics of the flow system is implemented. The filter may be configured as a Kalman filter, as described herein below.

In some cases, the act 418 includes an act 422 in which future flow feature data for the flow system for the following time interval is determined. The flow state prediction may thus include the future flow feature data. For example, the future flow feature data may be indicative of flux for the following time interval and/or data indicative of density for the following time interval. Additional or alternative parameters may be included in the flow state prediction. Alternatively or additionally, the act 418 includes an act 424 in which a plurality of system parameters indicative of dynamics of the flow system are updated. The flow state prediction may thus include data specifying the plurality of system parameters. Further details regarding the future flow feature data and the system dynamics parameters are provided in connection with one or more examples below.

The flow feature data is then analyzed in an act 426. In the example of FIG. 4, the flow feature data is applied to a recurrent neural network and/or other neural network or machine learning tool. The recurrent neural network and/or other machine learning tool is configured to provide an assessment, for each time interval in the series of time intervals, of whether the input flow data is indicative of the abnormality being present in a following time interval in the series of time intervals. In some cases, the flow state prediction is also applied to the recurrent neural network. The assessment may thus be based on the flow feature data and the flow state prediction. For example, the act 426 may include an act 428 in which the flow state prediction is provided at both input and output ends of the recurrent neural network, as shown in, e.g., FIG. 2.

In some cases, the recurrent neural network is configured as a cost-sensitive recurrent neural network via a plurality of weights to add weight to a minority class associated with a positive detection of the abnormality. For example, the recurrent neural network may be configured as an echo state network. Further details regarding examples of the recurrent neural network are provided below.

In an act 430, output data indicative of the assessment is provided. In some cases, the act 430 includes generating an alarm or alert in the event that the assessment provides that the input flow data is indicative of the abnormality being present in a following time interval.

Further details are now provided regarding how the disclosed methods and systems may be used in detecting macroscopic abnormalities occurring on a given trading day, such as medium intensity crashes. These abnormalities create an imbalance with normal market activities because they rarely occur. To address these challenges, the disclosed methods and systems present a cost-sensitive classification technique based on a recurrent neural network, such as those that implement reservoir computing. The reservoir computing may process predictions from a physics-based, or flow, representation of the price data. The flow representation incorporates information about the underlying mechanism of the markets, showing significant improvement in detection accuracy.

The disclosed methods and systems may be used for identifying abnormalities (e.g., medium intensity crashes) in equity markets using recurrent neural networks, such as those that implement reservoir computing. In reservoir computing recurrent neural networks, most or many of the network parameters are generated randomly, with others being optimized or trained. In financial examples, the reservoir computing recurrent neural network may be configured to classify medium frequency trading into normal and abnormal activity. The reservoir computing recurrent neural network may utilize a hybrid set of inputs, including a multivariate time series of macroscopic variables, and features extracted from the input flow data, to detect abnormalities with high accuracy (e.g., low false negatives and low false positives). As described herein, a cost-sensitive recurrent neural network may be used to address the challenge presented by forecasts involving an imbalance in the classification problem. A number of examples are presented in connection with several datasets (e.g., more than fifteen days) from the last ten years in which medium crashes have been reported.

As used herein, bold and small letters represent vectors, and bold and capital letters represent matrices. For example, x is a vector, while X is a matrix. The $L_2$ norm is given by $\|x\|_2$. The vector $e_j$ denotes an all zero vector with 1 in the jth element. The symbol $\oplus$ denotes the concatenation of two vectors.

The forecast or assessment addressed by the disclosed methods and systems may involve d days (e.g., trading days) with the empirical data $\{x(t); y_{target}(t+1)\}^d$, where $x(t)$ is the given raw data input at time t or feature and $y_{target}(t)=\{0; 1\}$ is the true class or output at time t, where 0 corresponds to a normal day and 1 to an abnormal trading day. The empirical data is available for $t=0, \ldots, T-1$, indicating that the input and output are collected in discrete time with a time step $\Delta t=1$. The classification task may be divided into two stages: training and testing stages. In the training stage, the classification task aims to learn (or fit) a classifier $y(t+1)=f(x(t), x(t-1), \ldots x(0); w)$, which is parameterized by w, using the empirical data, where the classifier provides $\{0, 1\}$, such that a loss function $l(y; y_{target})$ is minimized. In the testing stage, the fitted classifier is used to provide a prediction, forecast, or assessment about a newly encountered trading day with a new $x(t)$.

As described herein, feature extraction is implemented to extract more properties of $x(t)$ which might be more relevant or otherwise useful in the classification. For an input $x(t)$, the feature vector may be represented as $u(t)=\phi(x(t))$, where $\phi$ is a feature extraction function. The feature vector allows a rich representation about the input to be captured, thereby improving the learning process. The classifier may be rewritten as $f(u(t), u(t-1), \ldots u(0); w)$. As with the previous representation of the classifier, the classification may center on learning the classifier such that the minimum loss is achieved.

The recurrent neural network may have three main layers or components: the input, hidden and output layers. The network receives the data through the input layer. In a hidden layer, computational units (called neurons) apply a transformation to the input, which then is sent to the output layer. Any number of hidden layers may be included. Recurrent neural networks (RNNs) are a category of artificial neural network useful for modeling sequential and time series data. A recurrent neural network is or includes a feed forward neural network characterized by including information from adjacent time steps, featuring the notion of time to the network. This feature allows the network to learn the sequential/temporal dependencies in the data. In some cases, the recurrent neural network is configured as an echo state network, but other types of recurrent neural networks may be used. Other neural networks, where sequential information or temporal data is processed, may be used, including, for instance, long short-term memory (LTSM) networks.

With reference again to FIG. 1, the left-hand block represents a feature extraction method. This is applied to the raw data such that the detection of medium intensity crashes becomes more feasible, for which further details are provided below. The first layer of the recurrent neural network includes nodes to represent the time dependent input. The extracted input may be denoted as u(t). The input is a vector of features with N dimension at time t. The input is connected to the second layer (e.g., a reservoir). The connections between the input and the reservoir are represented by the matrix $W_{in}$. The reservoir consists of L neurons as shown in FIG. 1. In this example, the topology of the reservoir is cyclic. The reservoir connections are represented by the matrix $W_r$. The state vector of the reservoir may be denoted by r(t). The vector r(t) evolves over time with a discrete time step. The reservoir r(t) may be updated according to the following expression.

$$r(t+1)=(1-\alpha)r(t)+\alpha \tan h(W_{in}u(t)+W_r r(t))$$

One approach for interpreting the reservoir outputs for the classification is to classify the input based on the reservoir state r(t), which is given by the following expression.

$$y(t)=w_{out}r(t)+b,$$

where y(t) is the output of the reservoir (e.g., normal or abnormal), $w_{out}$ is the readout weights vector, and b is a bias term. Both of these parameters may be optimized during the training stage. The readout weights and bias may be determined such that the above-referenced loss factor is minimized over, e.g., a number (d) of training days.

The recurrent neural network may be configured for cost-sensitive reservoir computing. In some cases, a cross entropy loss function is used. The parameters $w_{out}$ and b may be determined via implementation of an optimization procedure, such as a stochastic gradient descent procedure. In some cases, a penalty may be added to a cost function, such as a penalty term $L_2$ norm to a cost function as follows:

$$J(w_{out}, b) = -\frac{1}{T*d}\sum_{i=1}^{d}\sum_{t=0}^{T-1}\left[\left(\xi_{c_2 c_1} y_{target}^{(i)}(t)\right)\log\left(y^{(i)}(t)\right) + \left(1 - y_{target}^{(i)}(t)\right)\log\left(1 - y^{(i)}(t)\right)\right] + \frac{\lambda}{2}\|w_{out}\|_2^2,$$

With reference again to FIG. 2, the above-described recurrent neural network may be combined with the physics, or dynamics, of the flow system (e.g., the equity market(s)) to improve the classification accuracy. As described below, a prediction of the state of the flow system u(t) for time t+1 may be generated based on knowledge of the input flow data up to time t. For example, a one-step ahead prediction based on the dynamics of the flow system may be given by $$\hat{u}(t+1)=U[u(t)],$$

where û is the predicted state of the flow system (e.g., market(s). Further details regarding the predictive function U are provided below in connection with one or more examples.

As shown in the example of FIG. 2, the reservoir and overall system output are based on the predicted state of the flow system at time t+1 as follows:

$$r(t+1)=(1-\alpha)r(t)+\alpha \tan h(W_{in}(u(t)\oplus \hat{u}(t+1))+W_r r(t))$$

$$y(t+1)=f(\hat{u}(t+1)\oplus r(t+1); w_{out}; b),$$

where $W_{in}$ is the input matrix, f is the sigmoid function, and $w_{out}$ is the readout weights vector.

The disclosed methods and systems may be used to detect abnormalities in a flow dataset, such as the flow data presented by one or more financial markets (e.g., equity markets). The abnormalities may be indicative of crashes, such as medium intensity crashes, or other intensity variations. In some cases, the input flow data may correspond with, be based on, or otherwise include the raw data of stock prices traded in three major US equity markets, namely: New York Stock Exchange (NYSE), NASDAQ, and American Stock Exchange (AMEX). On any trading day, approximately 4,000 shares were collected. Data frequency is one minute (i.e., the stock movement is recorded every minute). This frequency is useful for the detection of medium-frequency abnormalities. To begin, the data may be cleaned to remove inactive stocks (a stock is active if it is traded more than 75% of a trading day). When a stock was not traded at a particular minute, its price may be carried forward to the last traded price. In other examples, an interpolation may be used to determine other price levels.

Following the pre-processing of data noted above, time and space may be discretized. The time t was discretized into m equally spaced intervals. Each interval $\Delta t=1$ matches the data frequency. Space, which in this example is in dollars ($), was discretized into n price ranges. The discretization size of space $\Delta x$ may be assumed to be one as well. As described herein, the set of features includes a set of macroscopic variables, e.g., density and velocity, and information obtained from the dynamics of the flow system. The density $\rho$ and velocity v at a price x and time t may be calculated as follows:

$$\rho(x, t) = \frac{N(x, t)}{\Delta x},$$

$$v(x, t) = \frac{1}{N(x, t)}\sum_{j=1}^{N(x,t)} v_j(t),$$

where N(x, t) represents the number of stocks in price x and time t.

After obtaining the macroscopic variables which represent the overall markets state, a second set of features are generated for the recurrent neural network. These features are composed of the parameters of the dynamics, and predicted state, of the flow system. The dynamics parameters are useful to describe equity markets during high volatility and shocks periods. Further details regarding the prediction methodology for both the parameters and state variables are provided below.

To train the recurrent neural network, the macroscopic features may be processed further to obtain $y_{target}$ for each minute in the market. In one example, a 95% confidence interval at time t is determined from the previous ten minutes information. A feature at time t may be labeled as abnormal if it is not within the confidence interval. A feature vector u(t) may be labeled as abnormal at time t when at least five of its features are abnormal at that time.

To have an adequate assessment of the classification results for the imbalanced data, an evaluation matrix suitable for imbalanced data may be used. In one example, the classification results may be summarized by a confusion matrix, as shown in Table 1. In this example, the majority class represents the negative class and the minority class represents the positive class.

TABLE 1

Confusion Matrix

|  |  | Predicted Class | |
| --- | --- | --- | --- |
|  |  | Predicted Normal | Predicted Abnormal |
| True Class | True Normal | True Negative (TN) | False Positive (FP) |
|  | True Abnormal | False Negative (EN) | True Positive (TP) |

The accuracy of the classification may be computed as follows:

$$\text{Accuracy} = \frac{TP + TN}{TN + FP + FN + TP}$$

Other evaluation matrices may also be used, including Precision, Recall, F-measure, and Area Under the ROC Curve (AUC). The Precision measures how accurate the model is in labeling examples as abnormal when they are abnormal. When the cost of false positive (i.e., when the cost of alarming the market about a crash, when in fact, there is not one) is high, this measure should be high.

$$\text{Precision} = \frac{TP}{TP + FP}.$$

Recall measures the accuracy of the model in detecting abnormal examples. If the cost of the false negative (i.e., when the model does not recognize a crash) is high, the Recall measure should be high.

$$\text{Recall} = \frac{TP}{TP + FN}.$$

Another measure is F-measure, which is defined as follows:

$$F\text{-Measure} = \frac{2 * \text{Recall} * \text{Precision}}{\text{Recall} + \text{Precision}}.$$

This measure is preferable when the goal is to balance both the Precision and Recall.

An example training procedure is now described in which 20 trading days of input data is provided. Each trading day is about 391 minutes long. The trading days are divided into S segments of length T*. Each segment is considered to be independent from all other segments on the same day and other days (i.e., Markov property of equity markets). Each segment start at time 0 and end at time T*−1. Thus, the cost function is modified slightly such that d is replaced by d×S and T−1 is replaced by T*−1. In this way, the neural network can learn from a wider range of examples and patterns. In this stage, the neural network is trained on 75% of the d×S segments. A fraction, e.g., 15%, of the segments is used for testing. The extra segments are used for validation. The validation set is used to validate and tune reservoir and regularization parameters, and misclassification cost. In the validation, the optimal set of parameters may be found such that the Accuracy, Recall, and Precision are maximized, while placing more emphasis on Recall.

Figure 5:
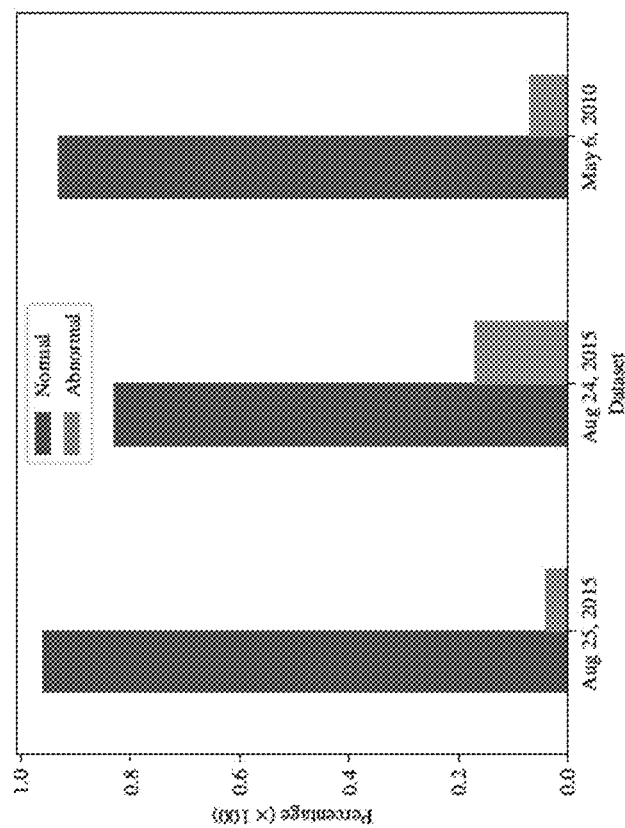
FIG. 5 depicts a graphical plot of results of use of the disclosed method and systems to detect abnormalities in several datasets representative of example flow systems.

FIG. 5 depicts the class distribution of the testing datasets. The results of testing the proposed approaches on datasets with abnormalities are now presented. As shown in FIG. 5, the class distribution is imbalanced. This is not surprising, insofar as medium intensity crashes do not happen often during trading days. Such crashes may vanish in a few minutes.

The results of testing the reservoir and hybrid approaches are shown in Table 3. For the results in Table 3, the parameters were set to the values shown in Table 2.

TABLE 2

Set of Parameters

| Parameter | Value |
| --- | --- |
| L | 500 |
| α | 0.9 |
| σ | 1 |
| ρ | 1 |
| λ | 0.001 |
| $\xi_{c_2 c_1}$ | 20 |

TABLE 3

Classification Results on the Testing Datasets

| Hybrid Approach | | | | | Reservoir Approach | | | | |
| --- | --- | --- | --- | --- | --- | --- | --- | --- | --- |
| Dataset # | | | | | Dataset # | | | | |
|  | Precistion | Recall | F-Measure | Accuracy |  | Precision | Recall | F-Measure | Accuracy |
| Aug. 25, 2015 | 1.0 | 1.0 | 1.0 | 1.0 | Aug. 25, 2015 | 0.11 | 0.50 | 0.18 | 0.70 |
| Aug. 24, 2015 | 0.67 | 0.80 | 0.74 | 0.90 | Aug. 24, 2015 | 0.50 | 0.60 | 0.55 | 0.83 |
| May 6, 2010 | 1.0 | 1.0 | 1.0 | 1.0 | May 6, 2010 | 0.25 | 1.0 | 0.40 | 0.90 |

The hybrid approach corresponds with the scheme of FIG. 2, while the reservoir approach corresponds with the scheme of FIG. 1. Table 3 shows that both approaches yield reasonable results. The hybrid approach seems to provide consistent results across different datasets. The Precision and Recall of the hybrid approach are high, while the Recall is acceptable for the reservoir approach. It should be noted that the reservoir parameters in both approaches were tuned such that the Recall is high even at the expense of the Precision. However, the Precision is high enough in most of the datasets. The F-measure for the hybrid approach is much higher than the reservoir approach, indicating the superior performance of the hybrid approach.

The classification addressed by the disclosed methods and systems involves making future predictions about the class of the input, not only detecting the current class. The hybrid approach proved to be a successful method. The reason behind this is that the hybrid approach includes additional information about the future from the physics-based dynamics of the flow system.

Further details of examples of the predictions for the state of, and dynamics parameters of, the flow system are now presented.

As addressed above, it has been recognized that stocks and other financial products flow as fluid particles and, thus, the corresponding markets may be represented via macroscopic variables, such as density and flux. In this view, stocks are aggregated and macroscopic variables such as density, and average velocity, are defined. The dynamics of these macroscopic variables are described through a system of stochastic inhomogeneous partial differential equations that provide a realistic representation of the market dynamics. Further information regarding this representation of a financial market are set forth in the above-referenced paper.

During rapid movement of prices (e.g., stock prices), the potential for shock wave formation exists. This and other dynamics of the flow system may be solved and thus represented. To this end, numerical methods may be used to solve the system of stochastic partial differential equations. Stochastic filtering techniques may also be used. After appropriate tuning, the representation of the market dynamics is efficient and able to detect abnormalities.

In this example, the space-time domain of the flow system is discretized into small regions or cells of price (x) and time (t). The price domain may have units of dollars, and the time domain may have units of minutes. In each cell, fluid dynamics is used to quantify stock price properties. Each stock is considered a single mass unit in the price-time domain. As mentioned above, to describe a stock's flow in the price-time domain, macroscopic variables velocity, density, flux and pressure are defined. The average velocity v(x; t) is defined as the average change in stocks' prices at a given price x and time t. The density ρ(x; t) is defined as the number of stocks per unit price x and unit time t. The flow of stocks is denoted by flux Q(x; t)=ρ(x; t)v(x; t). With these macroscopic variables, the flow system may thus be represented as the following system of stochastic partial differential equations (PDEs):

$$\rho(x, t)_t + Q(x, t)_x = a(x, t) + b(x, t)\rho(x, t) + \sigma_1(x, t)\frac{dW_1(x, t)}{dxdt},$$

$$Q(x, t)_t + ((1 + \alpha)Q(x, t)v(x, t))_x =$$

-continued
$$c(x, t) + d(x, t)Q(x, t) + \sigma_2(x, t)\frac{dW_2(x, t)}{dxdt}.$$

The right-hand side (called source or forcing term) represents a mean reversion process in which, after a disturbance, over time the density ρ(x; t) and flux Q(x; t) return to their historical average values. The Brownian sheet W(x; t) is a Gaussian stochastic process that captures any disturbances not implicitly represented in the model. The source term is time-varying and is adapted to and captures the market conditions.

The flow system representation has a plausible financial interpretation. The left hand side reflects the internal forces affecting a very small number of stocks. It captures the idiosyncratic or diversifiable risk. Internal forces and idiosyncratic risk are the drivers of stocks within the market, without the intervention of external forces. On the other hand, the right hand side (RHS) of (2.1) represents external forces and the systematic risk that is inherent in the whole market and can affect a large number of stocks.

Noting that the representation is a stochastic system of Partial Differential Equations (PDEs), the value of the parameter a determines the type of PDEs. For example, it has been shown that there was a shock wave on the flash crash day indicating that the representation may take the form of a hyperbolic PDE (solutions of this type of PDEs are wave-like). Thus, the value of the parameter may be chosen to preserve this property.

It can be shown through numerical analysis that the value of the a parameter may be arbitrary and constant. A value between zero and one may be selected.

Equity markets exhibit wave motion phenomenon in which information about stocks (particles), flow at a speed determined by the market conditions. A forward flowing shock carries information from lower priced stocks to higher priced ones, and a backward shock carries information from the higher priced to lower priced stocks. The phenomenon of waves is observed in many applications, including traveling sound waves in physics and traveling velocity waves in traffic flows.

With an appropriate choice of the parameter a, the flow system may exhibit shock or rarefaction waves. A shock is defined as a discontinuity and/or jump in density or velocity of stocks at price x and time t. Shock waves are observed in equity markets, but have relatively low speeds, and thus can be missed. On the other hand, rarefaction waves are more apparent in physical systems. In this example, rarefaction waves are gradual increases or decreases in the macroscopic variables. Indeed, such behavior might be attributed to the recovery process of markets.

Finite volume numerical methods may be used to solve the system of PDEs to show how, e.g., the density and velocity of stocks change over time, and thus predict future market conditions. For instance, stochastic filtering techniques are used to address the stochastic inhomogeneous aspects of the flow system. The filtering techniques may include adaptive estimation and filtering processes configured to address the noisy nature of the equity markets, or flow system. The estimation may determine the optimal estimate of the unknown variables (e.g., density, pressure, and flow system dynamics parameters) given the observed noisy measurements (stock price data). This process affects the performance of the prediction model since the future evolution of the macroscopic variables may depend on the initial condition which needs to be estimated. As described below, a filter-based approach may be used to adaptively predict and update the model states and time-varying parameters. The prediction filter approach is shown to be useful in monitoring equity markets. Therefore, accurate and adaptive estimation may be used to provide useful information to the above-described recurrent neural network, thereby ensuring or improving the reliability of the abnormality detection or assessment, which, when given to market makers, helps to achieve faster response to crashes and market anomalies.

The estimation of the state of the flow system may be achieved by Kalman filtering. Kalman filtering works in two steps: prediction and update. In the prediction step, the Kalman filter predicts the current state variable and error covariance given the previous posterior estimates of the state variable and error covariance. Once the outcome of the noisy measurement $y_t$ is observed at time t, the Kalman filter updates the estimates to produce the posterior estimates of the state variable and error covariance. The current state variable and the error covariance of the Kalman filter may be represented as follows.

Prediction Step:

$$\hat{x}_{t|t-1} = G_t \hat{x}_{t-1|t-1},$$

$$P_{t|t-1} = G_t P_{t-1|t-1} G_t^T + V_t.$$

Update Step:

$$y_t = z_t - H_t \hat{x}_{t|t-1},$$

$$K_t = P_{t|t-1} H_t^T (H_t P_{t|t-1} H_t^T + R_t)^{-1},$$

$$\hat{x}_{t|t} = \hat{x}_{t|t-1} + K_t y_t,$$

$$P_{t|t} = (I - K_t R_t) P_{t|t-1},$$

where $K_t$ is the optimal gain and $y_t$ is a measurement residual.

A recursive estimation method may be used to update current equity markets state and estimation of parameters and make one-step ahead prediction in real-time when new observations are collected. For instance, the density, flux, and system dynamics parameters may be estimated. In order to obtain the optimal estimate, a recursive estimation method (e.g., Kalman filtration) may be implemented. The estimation or filtering process includes a time update or prediction step in which the previous observations and the state transition function are used to estimate the state variable, and then a measurement or filtering update step in which the current measurements or observations are utilized to refine (filter) the estimated state variable. These acts may be used in connection with linear systems. Other filtering methods may be used to handle nonlinear systems.

In some cases, the Kalman filtering may be configured to implement an unscented Kalman filter. Other types of filters may be used, including, for instance, an ensemble Kalman filter. The ensemble Kalman filter is a sequential filtering method that is suitable for problems involving discretization of a system of partial differential equations. This method is considered a Monte-Carlo implementation to the Bayesian problem in which the prior estimation with new data is used to obtain the posterior estimation. The ensemble Kalman filter works as follows: a number of sample points called ensembles are generated from the prior estimation distribution. Each ensemble point is updated using a linear rule and Kalman gain, similar to the original KF update equation. The posterior estimation is the mean of the updated ensembles while their spread is the posterior covariance. The ensembles may be updated stochastically.

The filtering method may be configured to implement a dual estimation of the state variable and the system dynamics parameters. In the dual estimation, two filtering methods may be implementing concurrently for the state variable and the parameters. At every time step, the current estimate for the state variable is then used to estimate the parameters, while the current estimates for the parameters are used to estimate the state variable. Both estimations may use the same filtering method.

FIGS. 6-9 present the results of implementing the above-described filtering-based system state prediction and dynamic parameter generation. The underlying flow data included data from three equity markets: NASDAQ, NYSE, AMEX. The raw data was representative of minute resolution stock price information over a trading period of 9 hours per day. Close to 4000 stocks were collected. The space and time domains were discretized according to the CFL condition. That is, space (price) is discretized into N fixed intervals of size $\Delta x$ and time is discretized into M fixed periods of length $\Delta t$. The CFL stability condition establishes an upper bound on the ratio $\Delta x/\Delta t$, which relates to the maximum information speed $\lambda$. The information speed is a function of stock velocity, which is roughly bounded by one. This bound was validated by separate data. The average stocks velocity $v(x_i; t_j)$ and $\rho(x_i; t_j)$ are computed at price $x_i$ and time $t_j$ where i=0, . . . . N and j=0, . . . . M.

The filtering-based approach is first applied to data collected from the flash crash day, May 6, 2010. This day is considered by many researchers as unique in that we first observed consequences of the complexity of the algorithmic trading system. On that day, several markets experienced a sudden sharp decline followed by a correction in which losses were recovered by the end of the trading day.

Knowing that the flash crash started at 02:32 p.m., a sharp decline in density is very noticeable. The plunge persists over most of the price ranges. In other words, the disturbance propagates in a certain direction, affecting all stocks. This behavior is well captured by our model through what we defined as shocks and rarefaction waves.

Figure 6:
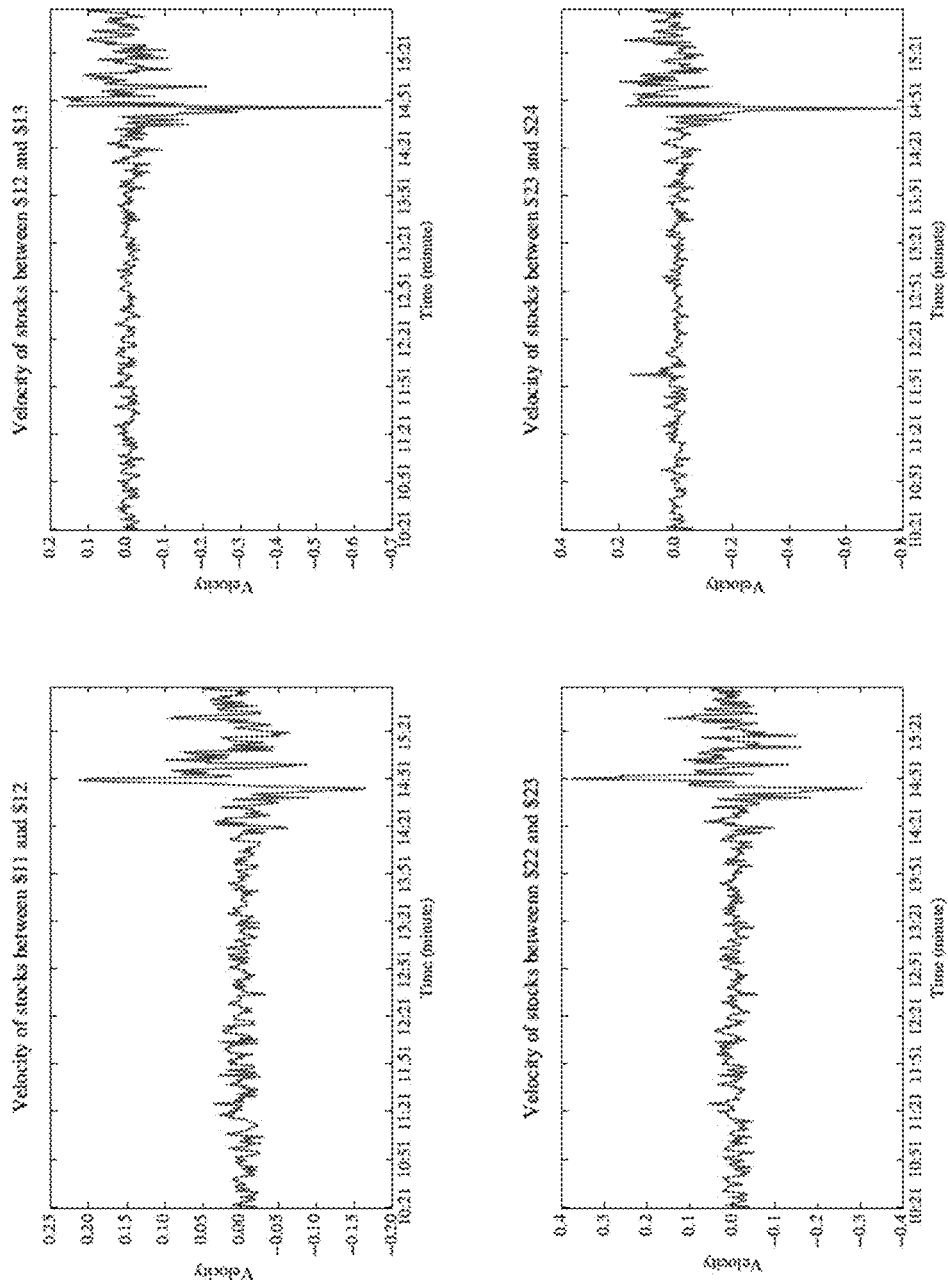
FIG. 6 depicts several graphical plots of flow feature data for a velocity parameter generated via the disclosed methods and systems in connection with several datasets representative of example flow systems.

Turning to the velocity of stocks, the velocity figures for various price ranges are illustrated in FIG. 6. The velocity appears to offer more information and sensitivity around the flash crash time. Although this might not be obvious from the figure, the disturbance is also persistent across various price ranges. More specifically, shock or rarefaction waves occurred in the velocity of stocks. From an examination of the density and velocity, it is shown that the macroscopic variables are well suited for signaling abnormality. However, given this information, it is still interesting to see the performance of the filtering-based approach to predicting these variables.

Figure 7:
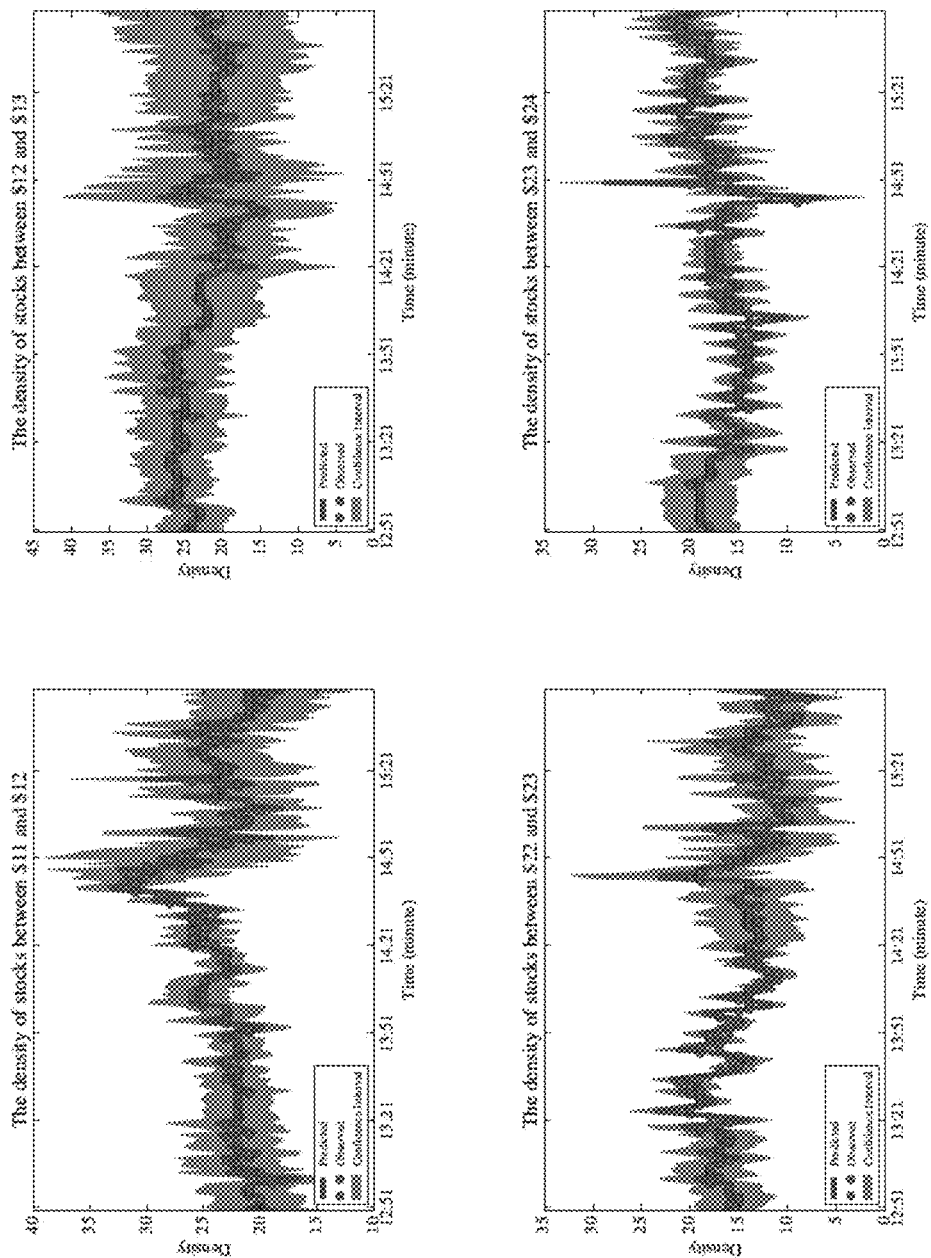
FIG. 7 depicts several graphical plots of flow feature data for a density parameter generated via the disclosed methods and systems in connection with several datasets representative of example flow systems.
Figure 8:
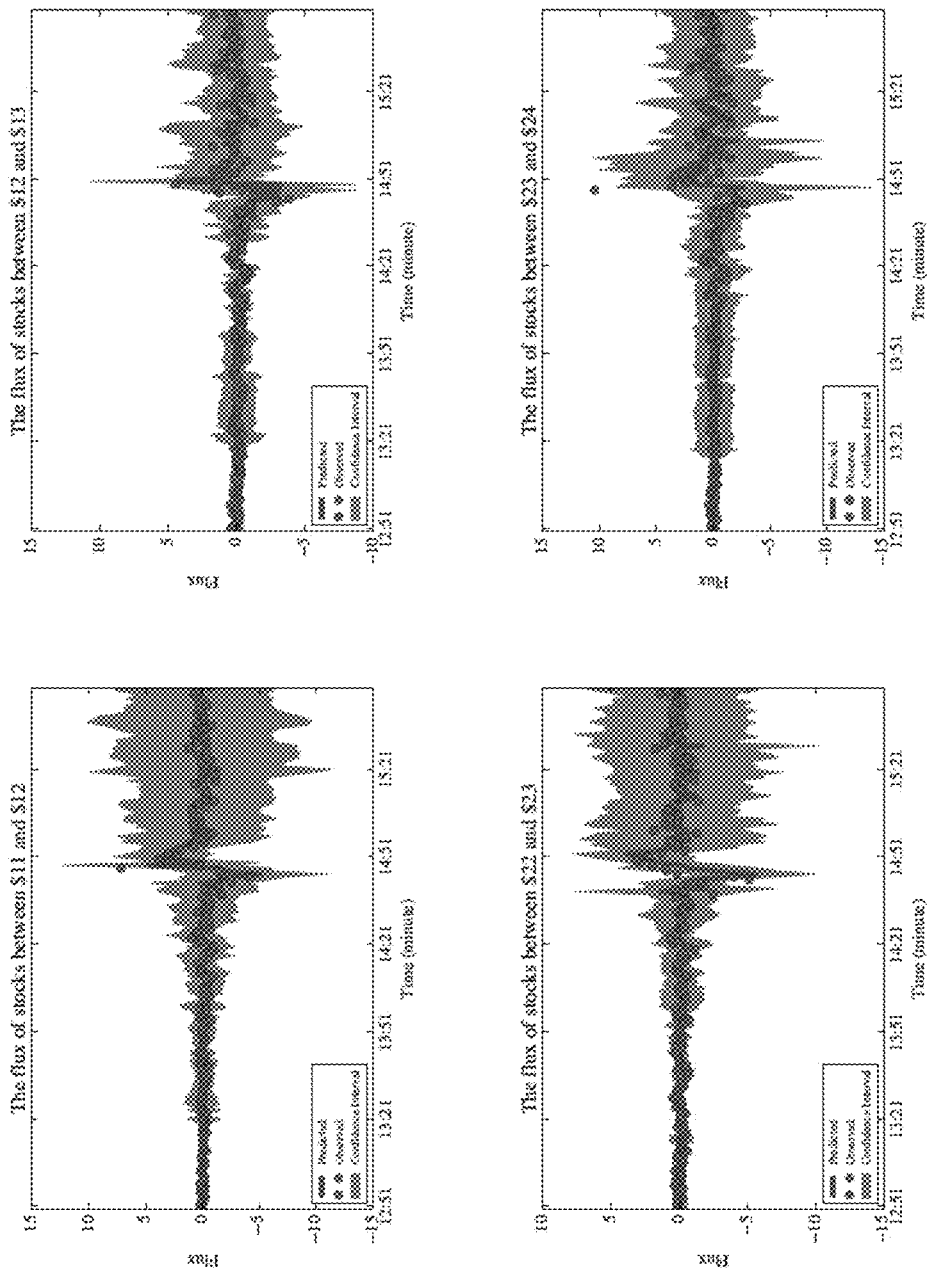
FIG. 8 depicts several graphical plots of flow feature data for a flux parameter generated via the disclosed methods and systems in connection with several datasets representative of example flow systems.

FIGS. 7 and 8 depict the one-step ahead prediction of density and flux for the period between 12:49 pm and 3:49 pm. FIGS. 7 and 8 show that the filtering-based approach is able to predict the direction of the crash and shows some signals prior to the crash.

Figure 9:
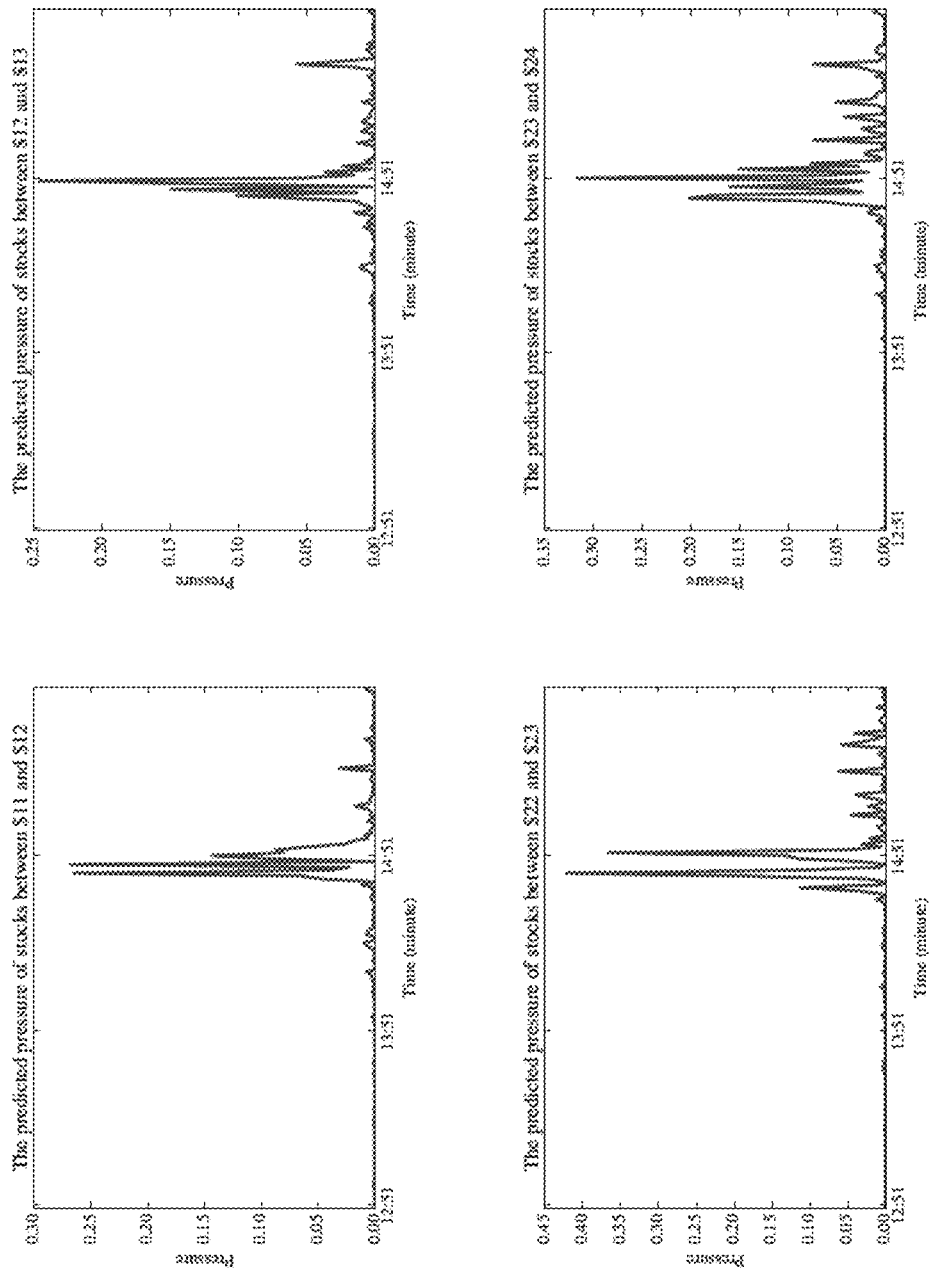
FIG. 9 depicts several graphical plots of flow feature data for a pressure parameter generated via the disclosed methods and systems in connection with several datasets representative of example flow systems.

FIG. 9 depicts the prediction results for pressure, which is defined as $\alpha Qv$. As can be seen in FIG. 9, the predicted pressure shows high sensitivity around the flash crash time and afterwards.

FIGS. 10-13 present the predictions based on data obtained from May 18, 2012, the day on which an initial public offering caused technical difficulties for the NASDAQ market.

Figure 10:
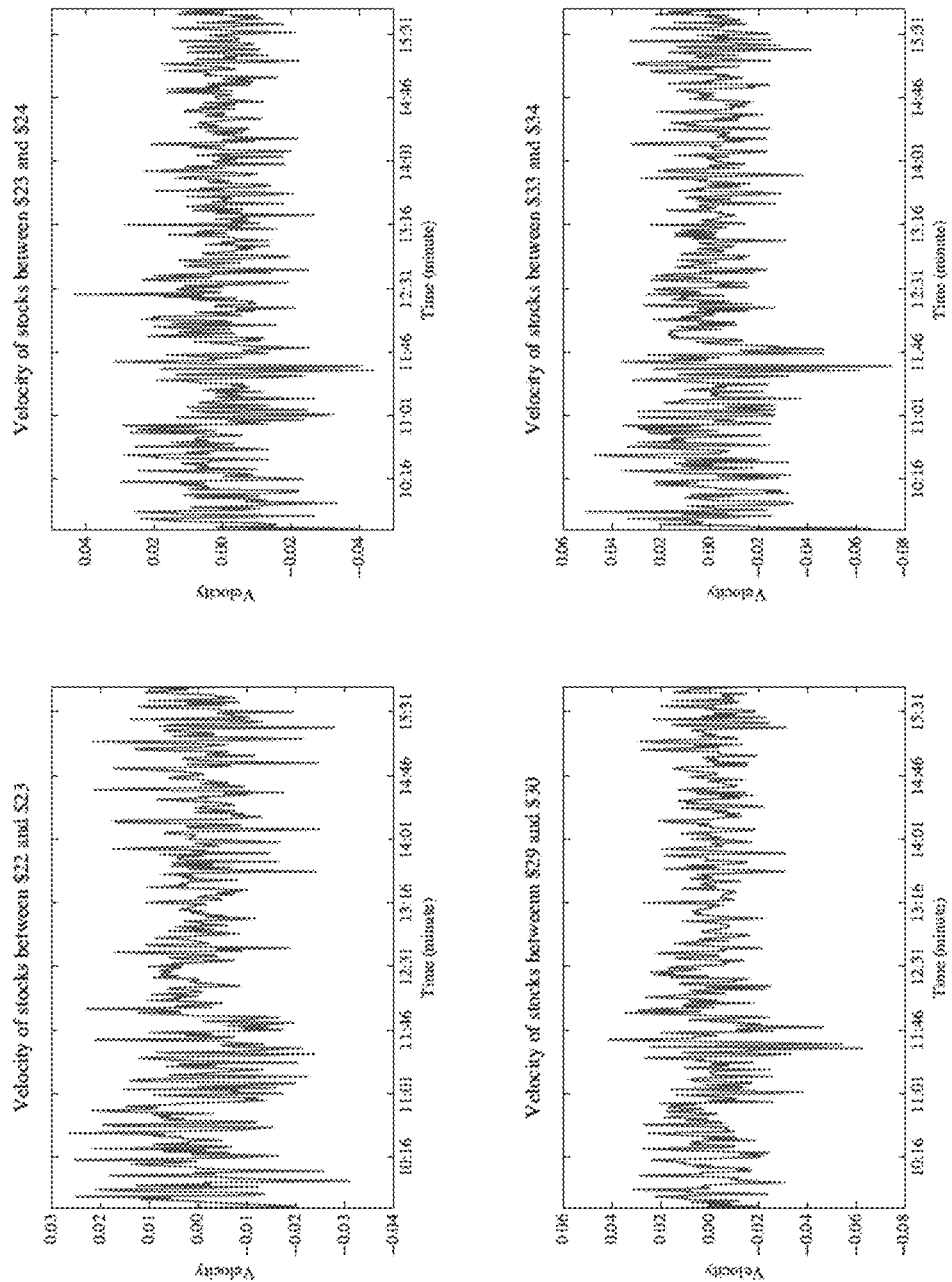
FIG. 10 depicts several graphical plots of flow feature data for a velocity parameter generated via the disclosed methods and systems in connection with several datasets representative of example flow systems.

FIG. 10 depicts the velocity plots for several price ranges. Three of the plots show that there was an unusual dip (or a crash) between 11:00 a.m. and 11:45 a.m. on May 18, 2018, which was the reported time for the public offering. Though the instability was caused by one stock, the glitches caused by that massive offering on the NASDAQ system created chaos across the market. A dip is present around the crash time in different price ranges. This means that the crash propagated from one price range to another, supporting the wave-like phenomenon of equity markets.

Figure 11:
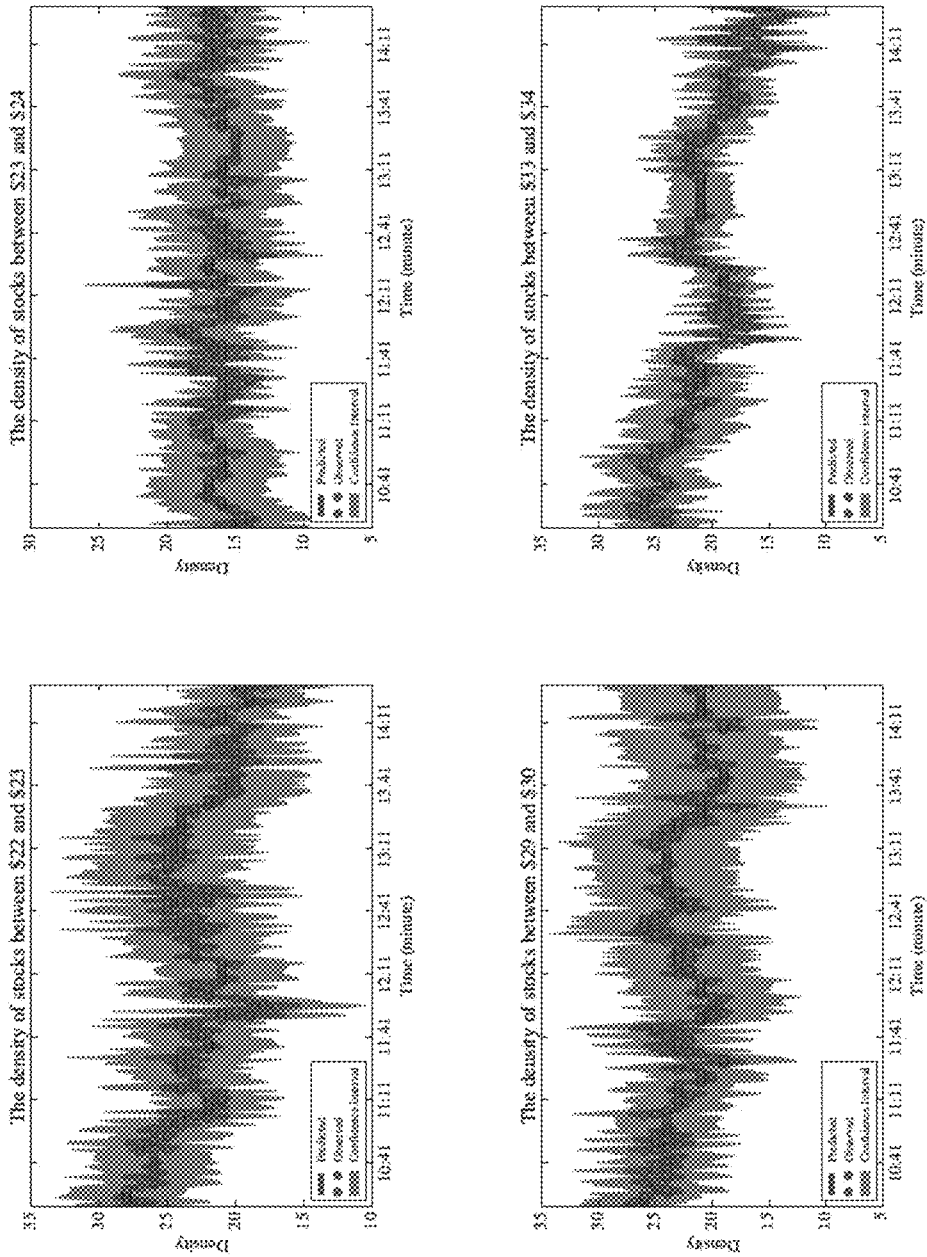
FIG. 11 depicts several graphical plots of flow feature data for a density parameter generated via the disclosed methods and systems in connection with several datasets representative of example flow systems.
Figure 12:
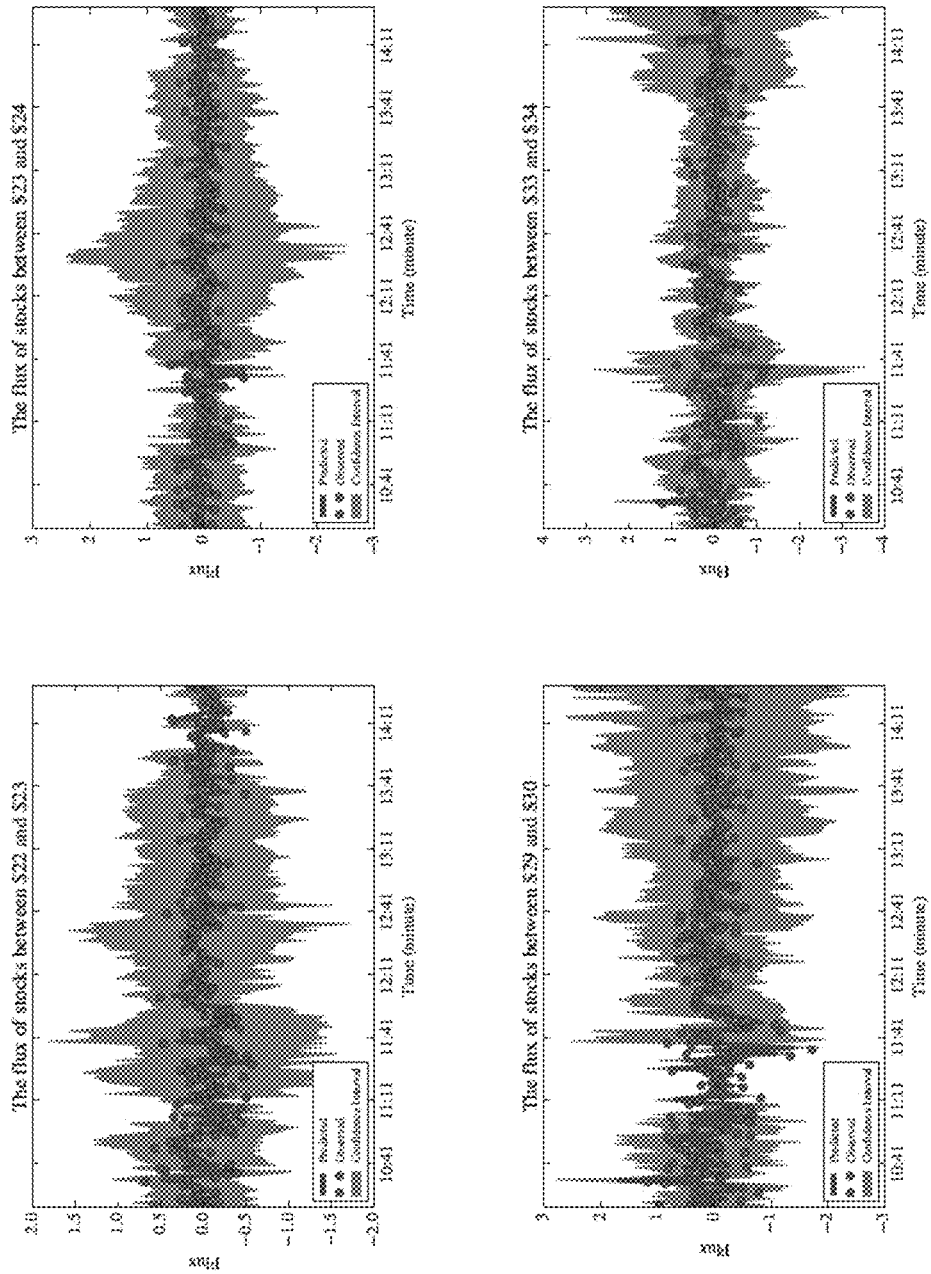
FIG. 12 depicts several graphical plots of flow feature data for a flux parameter generated via the disclosed methods and systems in connection with several datasets representative of example flow systems.

FIGS. 11 and 12 depict the one-step ahead prediction results for the density and flux. The figures show that the filtering-based approach is able to capture the fluctuations during normal and high volatility periods (e.g., around 11:30 am).

Figure 13:
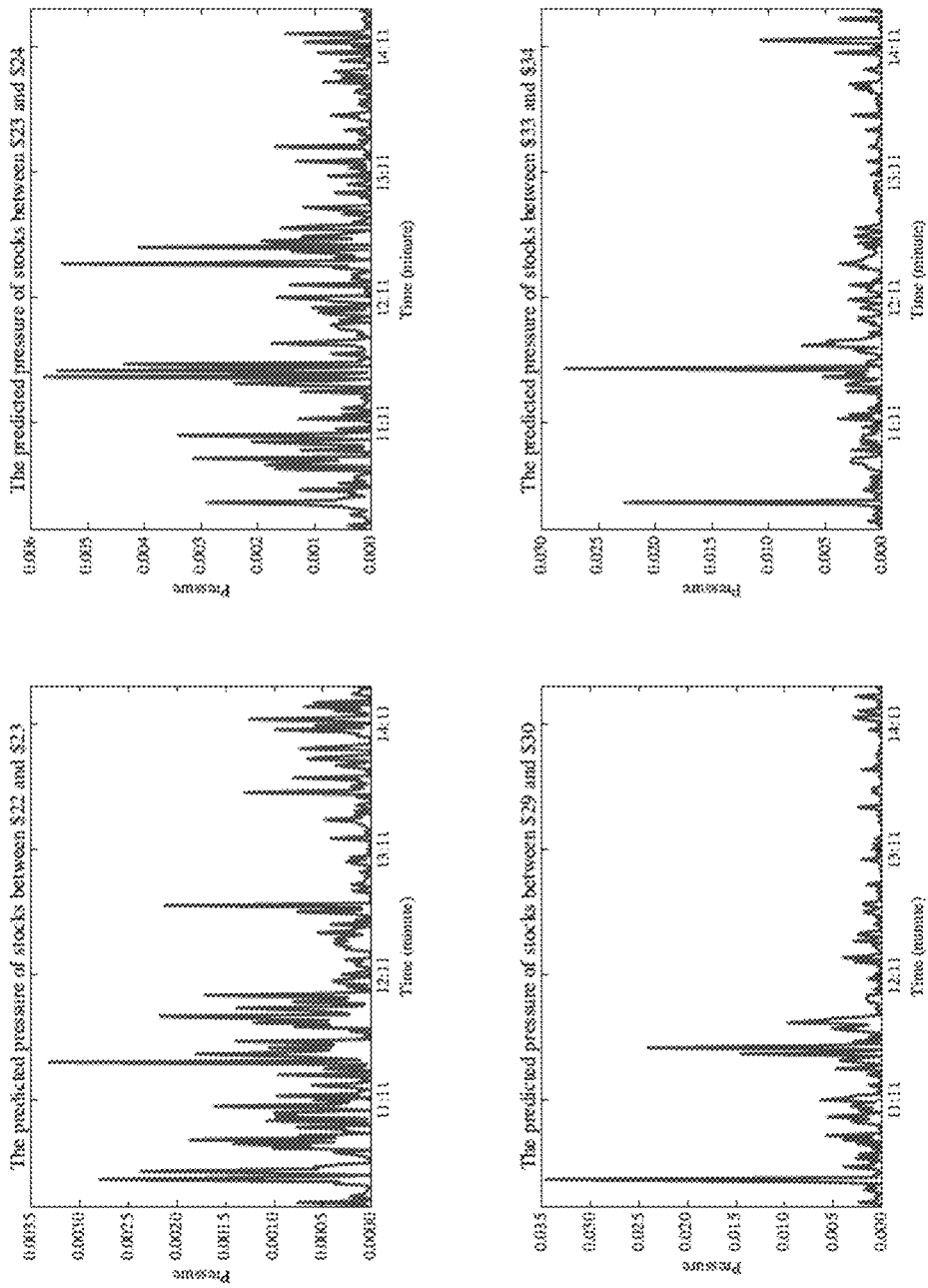
FIG. 13 depicts several graphical plots of flow feature data for a pressure parameter generated via the disclosed methods and systems in connection with several datasets representative of example flow systems.

FIG. 13 illustrate the predicted pressure. The pressure is more informative about unusual changes in the market, as seen in the plots around 11:30 a.m. The four figures have a common peak around that time.

As described above, the flow feature data generated by the disclosed methods and systems may be representative of external forces applied to the flow system. In examples involving price flows, the external forces may be indicative of investor impatience and activity in other markets (e.g., options and other derivatives markets). Further details regarding the generation of such flow feature data are set forth below.

Markets for stock options and other derivatives influence the underlying stock prices. In addition, movement in the fixed income markets affect stock valuations and are thus also influential. The external forces on stock prices generated by these markets, including an additional force referred to herein as "investor impatience," act similarly to gravity in physics. However, in contrast to our experience of gravity which acts in one direction, the external forces can act in either direction to increase or decrease the underlying stock's price.

As set forth in the above-referenced paper, the stocks of a market may be conceptualized as a set of fluid particles, with which aggregate behavior may be measured. The manner in which the density, velocity, and flux of such fluid flows are generated is described above and in the above-referenced paper. The velocity may be used to calculate another flow parameter, the kinetic energy, as follows.

Velocity (assuming unit mass):

$$E_k^{(K)}(t) = \frac{1}{2} v_k^2(t).$$

Kinetic Energy of a stock $$E_k^{(K)}(t) = \frac{1}{2} v_k^2(t).$$

Kinetic Energy of a price interval $$E^{(K)}(x, t) = \frac{1}{N(x, t)} \sum_{k: p_k(t) \in [x_1, x_2]} E_k^{(K)}(t).$$

where $N(x,t)$ denotes the number of stocks in the price section $[x_1, x_2]$.

The acceleration of stocks in a price interval may also be defined via the velocity as follows.

$$a(x, t) = \frac{\partial v(x, t)}{\partial t}$$

$$= \lim_{\Delta t \to 0} \frac{v(x, t + \Delta t) - v(x, t - \Delta t)}{2\Delta t}.$$

The above-described physics-based model may be extended to incorporate the accelerative effects of external forces on the market. The analogous physical variable is gravity, denoted by g. For a descriptive example, if the interest rate increases suddenly, investors will become more risk-averse, increasing the magnitude of gravity. The relationship between this additional parameter and the above-described parameters is now described. Beginning with Newton's second law of motion, the added gravitational term captures external market forces, representing an additional acceleration extrinsic to typical market motion as follows:

$$F(x,t) = m(x,t)a(x,t) + m(x,t)g(x,t)$$

Here, F represents the net force on the stocks priced x at time t. That is, the entirety of market forces causing acceleration in price movement. Here, the total force is decomposed into the sum of the internal forces (a), and the external forces (g), of which investor impatience is one. The mass of stocks is denoted by m. The mass contextualizes the acceleration, for a greater force is required on a proportionally larger mass to produce the same price acceleration. This mass may also be expressed as a product of density and volume as follows.

$$m(x,t) = \rho(x,t)V(x,t)$$

Similarly, the force term may be expressed as a product of pressure and area. This pressure is a result of the momentum with which stocks are moving in the price domain. Combining the foregoing equations yields the following relationship:

$$\alpha Q(x,t)v(x,t)A(x,t) = \rho(x,t)V(x,t)a(x,t) + \rho(x,t)V(x,t)g(x,t)$$

With V and A as unit values, the relationship may be combined with the definition of flux to yield the following relationship between investor impatience and the above-described terms of the model.

$$\alpha v^2(x,t) = a(x,t) + g(x,t)$$

if investor impatience indeed acts as an invisible force on the market, one should observe major price action coincident with large gravity parameter values in the absence of significant stock traded volumes.

Defining gravity allows for an expression of the potential energy of the market. Not only does this provide a measure of market activity, it also addresses the degree to which energy is conserved. As with momentum, the degree to which conservation is obtained may provide utility in sensing abnormal market events. The potential energy may be defined of a particular stock as follows.

$$E_k^{(P)}(t) = \rho(p_k(t),t)g(p_k(t),t)p_k(t)$$

The average potential energy in a particular price interval can therefore be defined as follows.

$$E^{(P)}(x, t) = \frac{1}{N(x, t)} \sum_{k: p_k(t) \in [x_1, x_2]} E_k^{(P)}(t).$$

Total energy at the price interval may then be specified as follows.

$$E(x,t) = E^{(K)}(x,t) + E^{(P)}(x,t)$$

The Euler energy conservation principle may be applied to yield the following:

$$\frac{\partial E(x,t)}{\partial t} + \frac{\partial}{\partial x}((E(x,t) + P(x,t))v(x,t)) = 0 \quad \forall\, x, t$$

which, when combined with the equation for the following equation for pressure (P), becomes:

$$\frac{\partial E(x,t)}{\partial t} + \frac{\partial}{\partial x}((E(x,t) + \alpha Q(x,t)v(x,t))v(x,t)) = 0 \quad \forall\, x, t$$

$$P(x,t) = \alpha Q(x,t)v(x,t),$$

The foregoing additions to the model and corresponding flow parameters are now applied in connection with input flow data from examples involving a short squeeze event and a flash crash event. The flash crash of May 6, 2010 saw a rapid decline and recovery of the U.S. stock market. The flash crash complements the short squeeze event because, in contrast to a focus on a few stocks targeted by a large group of traders, the flash crash was a truly market-wide event.

The short squeeze event occurred in January 2021 in connection with the stock of GameStop ($GME). Over a period of two weeks, ending January 27, retail investors increased GameStop's stock price 1,500%. Many participated by engaging in the options market, purchasing call options for leveraged upside exposure. By January 26, short sellers had collectively lost a reported $6 billion. A variety of other stocks experienced similar sharp price increases, including Bed Bath & Beyond Inc. ($BBBY). The unprecedented frenzy of retail trader speculation over this brief period clearly demonstrates investor impatience. As described above, the gravitational term may be conceptually thought of as the combination of external forces from other markets and investor impatience. With regard to the short squeeze event, the options market played a central role.

The continuous equations described above may be discretized to handle the discrete nature of the market data. A regression model may be used for the gravity term. A linear regression model relating observed acceleration to squared velocity, estimating gravity for a price/time combination, may be used as a fitting mechanism as follows.

$$a(x,t) = -g(x,t) + \beta \alpha v^2(x,t) + \sigma(x,t)\epsilon,$$

where $\epsilon$ is an error term. The linear regression may be performed to generate parameter estimates of $g(x,t)$, $\beta(x,t)$, and $\sigma(x,t)$.

Parameterization of the energy conservation equation is now described. Although the right-hand side of the conservation equation referenced above is zero at all points, a forcing term is used due to discretization error and uncertainty which disturb this equation. A stochastic forcing term is therefore used as follows:

$$\frac{\partial E(x,t)}{\partial t} + \frac{\partial}{\partial x}((E(x,t) + \alpha Q(x,t)v(x,t))v(x,t)) = z(x,t)$$

$$z(x,t) = l(x,t) + \theta(x,t)E(x,t) + \sigma_z(x,t)\frac{dW(x,t)}{dxdt}$$

Here, $l(x;t)$ is a deterministic function to account for the mean inflow or outflow from the conservation equation. The deterministic function $\theta(x,t)$ is the rate of mean-reversion to the mean of the right-hand side of the equation. The W term is a Brownian sheet, which is a Gaussian stochastic process. The $\sigma_2(x,t)$ term represents the volatility of the energy conservation process.

The linear regression may be implemented as follows. Calculating the model parameters using equity market data requires specifying the discretization of price and time. In this analysis, a discretization of $\Delta x=\$1$ and $\Delta t=1$ minute. To estimate g at point $(x_i,t_j)$, a linear regression using calculated values is fit for $a(x,t)$ and $v^2(x,t)$ in a 3×3 grid of prices and times.

The fitted gravitational parameter is now applied to an example data involving a set of notable dates and stocks during the short squeeze. Also presented are the results of fitting the conservation of energy equation. Then the model is applied to the data from the 2010 Flash Crash. A clear presence of a negative gravitational force prior to the onset of the crash is demonstrated. The conservation of energy equation parameters also exhibit unusual behavior before the crash begins and therefore may be used as flow feature data in the above-described methods and systems for detecting abnormalities in the market or other flow system.

Figure 14:
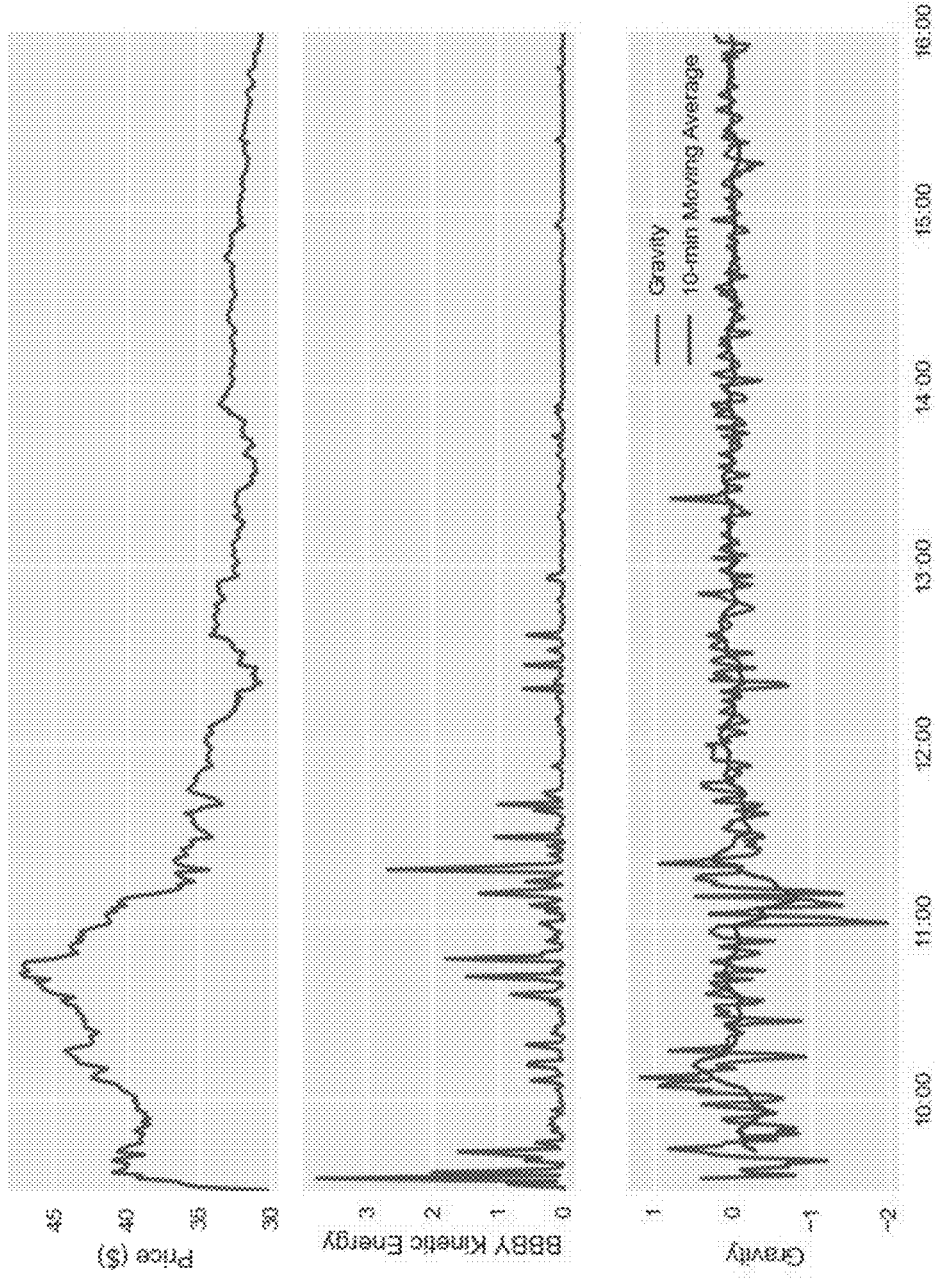
FIG. 14 depicts graphical plots of flow feature data for a kinetic energy parameter and an external force parameter generated via the disclosed methods and systems in accordance with one example and in connection with a dataset representative of an example flow system, along with a graphical plot of the underlying input flow data.

FIG. 14 shows the fitted parameter values for $BBBY during the short squeeze event. Specifically, the stock's kinetic energy and the macroscopic gravity parameter are plotted for the stock's price during each time period. The simple moving average of gravity over a 10-minute period is also plotted.

The rate of decline in the morning is clearly exhibited in the kinetic energy of the stock. Coincident with this decline were a few spikes in stock and options volumes. However, most notably, highly negative and persistent gravity is also observed over this time period, exhibited by the strong deviation in the parameter's moving average. Recall that the gravitational term is interpreted as the sum of forces from other markets and investor impatience. Observationally, these forces appear to have an impact on the behavior of this stock. Because traded options volumes were relatively unremarkable over this time period, it may be inferred that investor impatience is the dominant force.

Figure 15:
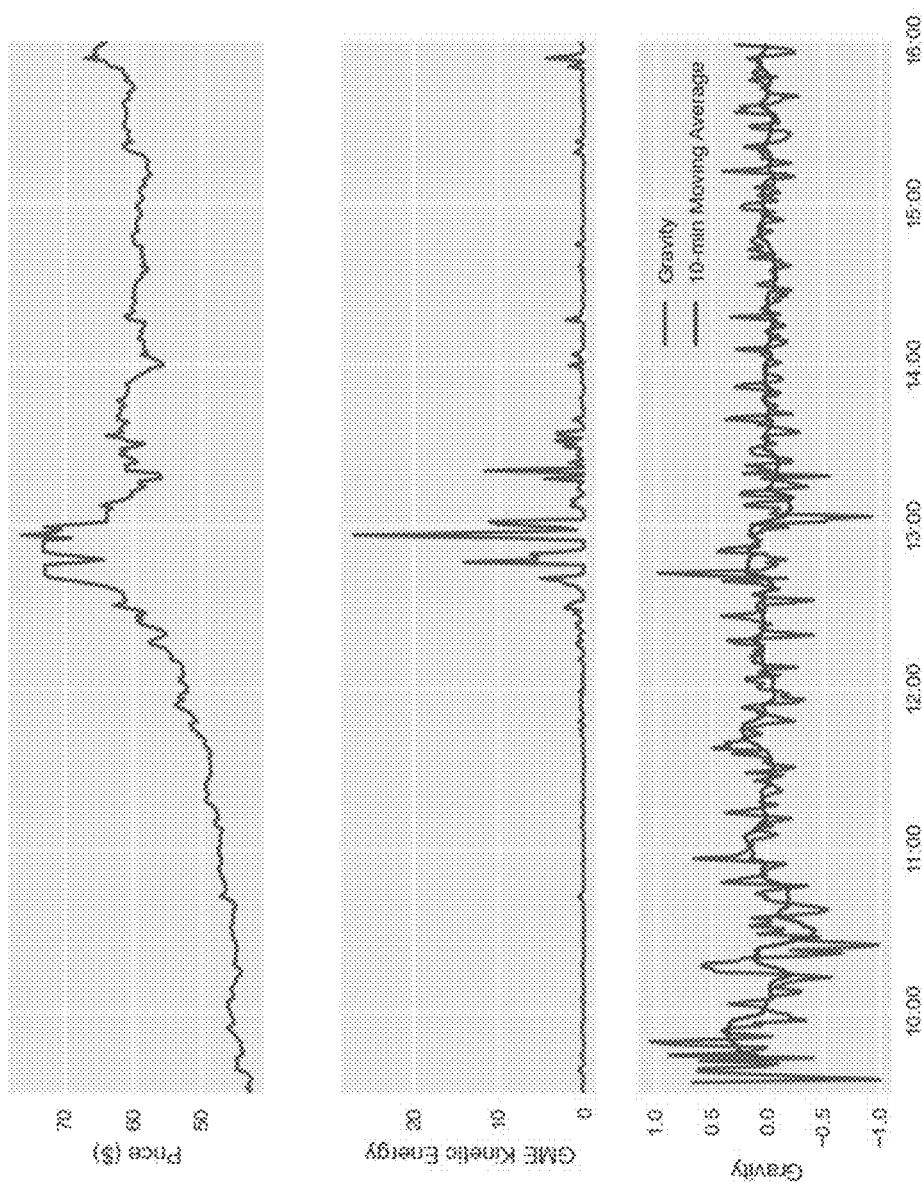
FIG. 15 depicts graphical plots of flow feature data for a kinetic energy parameter and an external force parameter generated via the disclosed methods and systems in accordance with one example and in connection with a dataset representative of another example flow system, along with a graphical plot of the underlying input flow data.

FIG. 15 shows a similar series of graphs for the GameStop stock on January 22, during which the stock rallied over 50% into the early afternoon, before declining after 1:00 pm. It is noted that gaps in the data are due to trading of the stock being temporarily halted by the New York Stock Exchange. In addition to exceedingly high traded volumes of stock and options, the gravity parameter exhibits two notable spikes at the end of the rally and during the subsequent drawdown, albeit at an amplitude less than that of $BBBY in FIG. 14. One can see a clear reversal in gravity through the moving average of this parameter. Through the lens of the macroscopic model, we may infer that external forces of options markets and investor impatience may have had episodic influence on the stock behavior.

FIG. 16 depicts an example application of the fitted model parameters to the flash crash of May 2010. The graphical plot of FIG. 16 shows the fitted gravity parameter during the ash crash for stocks between $20 and $21, as well as the average gravity in a trailing window of ten minutes. For nearly the entire hour prior to the onset of the crash, the gravity parameter remains negative. This indicates that an external force was acting on the market before it crashed. This pattern was not limited to stocks within this price interval. A noticeable presence of negative gravity leading up to the crash was present, acting across multiple stock prices simultaneously. This supports the use of macroscopic modelling for this phenomenon as it shows the market behavior is not idiosyncratic to a subset of stocks.

The conservation of energy equation fitted parameters also have interesting behavior prior to the crash. FIG. 17 shows the fitted parameters for the conservation of energy for stocks between $20 and $21 during the crash. Most interestingly, a clear increase in the volatility term is observed prior to the crash beginning. The mean inflow/outflow term also shows an increase in magnitude prior to the crash. The mean-reversion term also has its highest magnitude reading minutes before the crash. The conservation of energy equation may thus be used by the disclosed methods and systems for detecting abnormal market activity in advance.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A method for detecting an abnormality in a flow system, the method comprising:
    obtaining, with a processor, input flow data for the flow system over a series of time intervals, each time interval of the series of time intervals having a unit of minutes, the series of time intervals extending over a number of days;
    sequentially processing, with the processor, the input flow data to generate, for each time interval in the series of time intervals, flow feature data, the flow feature data being representative of a plurality of flow parameters for the input flow data at the time interval in the series of time intervals;
    applying, with the processor, the flow feature data to a machine learning tool, the machine learning tool being configured to provide an assessment, for each time interval in the series of time intervals, of whether the input flow data is indicative of the abnormality being present in a following time interval in the series of time intervals; and
    providing, with the processor, output data indicative of the assessment;
    wherein providing the output data comprises generating an alert when the input flow data is indicative of the abnormality being present in the following time interval; and
    wherein the machine learning tool comprises a recurrent neural network such that applying the flow feature data comprises:
        providing the flow feature data as a time series of inputs to the recurrent neural network;
        processing, by the recurrent neural network, the time series of inputs with each flow parameter of the plurality of flow parameters being an input feature of the recurrent neural network; and
        configuring the recurrent neural network in a training stage as a classifier, the classifier comprising an input layer in which the time series of inputs are received, and a reservoir layer that applies transformations to the time series of inputs received at the input layer, the reservoir layer comprising a set of readout weights and a bias term, wherein configuring the recurrent neural network comprises optimizing the set of readout weights and the bias term during the training stage such that a loss factor between predicted and target classifications is minimized over a number of training days of training data.

2. The method of claim 1, further comprising generating, with the processor, a flow state prediction for the flow system for the following time interval in the series of time intervals based on the flow feature data for each time interval in the series of time intervals.

3. The method of claim 2, wherein applying the flow feature data to the machine learning tool comprises applying the flow state prediction to the recurrent neural network such that the assessment is based on the flow feature data and the flow state prediction.

4. The method of claim 2, wherein applying the flow feature data to the machine learning tool comprises providing the flow state prediction at both input and output ends of a recurrent neural network.

5. The method of claim 2, wherein generating the flow state prediction comprises updating a plurality of system parameters indicative of dynamics of the flow system, the flow state prediction comprising data specifying the plurality of system parameters.

6. The method of claim 2, wherein generating the flow state prediction comprises determining future flow feature data for the flow system for the following time interval.

7. The method of claim 6, wherein the future flow feature data comprises data indicative of flux for the following time interval and data indicative of density for the following time interval.

8. The method of claim 2, wherein generating the flow state prediction comprises implementing a filter configured in accordance with dynamics of the flow system.

9. The method of claim 8, wherein the filter is configured as a Kalman filter.

10. The method of claim 1, wherein the recurrent neural network is a cost-sensitive recurrent neural network such that configuring the neural network comprises adding weight to a minority class associated with a positive detection of the abnormality.

11. The method of claim 1, wherein recurrent neural network is an echo state network.

12. The method of claim 1, wherein the plurality of flow parameters comprises velocity and density.

13. The method of claim 1, wherein the plurality of flow parameters comprises an external force applied to the flow system.

14. The method of claim 1, wherein:
    sequentially processing the input flow data comprises generating energy conservation parameters for the flow system by fitting the input flow data to a conservation of energy equation; and
    the plurality of flow parameters comprises at least one of the generated energy conservation parameters.

15. The method of claim 1, wherein the input flow data is representative of price data for a plurality of financial products over the series of time intervals.

16. The method of claim 1, wherein the flow system comprises a financial market such that the abnormality comprises a crash in the financial market.

17. A system for detecting an abnormality in a flow system, the system comprising:
    a memory in which flow feature extraction instructions and neural network instructions are stored; and
    a processor coupled to the memory, the processor obtaining input flow data for the flow system over a series of time intervals, each time interval of the series of time intervals having a unit of minutes, the series of time intervals extending over a number of days;

wherein the processor executes the flow feature extraction instructions and sequentially processes the input flow data to generate, for each time interval in the series of time intervals, flow feature data, the flow feature data being representative of a plurality of flow parameters for the input flow data at the time interval in the series of time intervals;

wherein the processor executes the neural network instructions and applies the flow feature data to a recurrent neural network, the recurrent neural network provides an assessment, for each time interval in the series of time intervals, of whether the input flow data is indicative of the abnormality being present in a following time interval in the series of time intervals; and wherein the processor generates an alert when the input flow data is indicative of the abnormality being present in the following time interval; and wherein the processor further—
provides the flow feature data as a time series of inputs to the recurrent neural network;
processes, by the recurrent neural network, the time series of inputs with each flow parameter of the plurality of flow parameters being an input feature of the recurrent neural network;
configures the recurrent neural network in a training stage as a classifier, the classifier comprising an input layer in which the time series of inputs are received, and a reservoir layer that applies transformations to the time series of inputs received at the input layer, the reservoir layer comprising a set of readout weights and a bias term; and
optimizes the set of readout weights and the bias term during the training stage such that a loss factor between predicted and target classifications is minimized over a number of training days of training data.

18. The system of claim 17, wherein:
filter instructions are stored in the memory;
the processor is configured, via execution of the filter instructions, to generate a flow state prediction for the flow system for the following time interval in the series of time intervals based on the flow feature data for each time interval in the series of time intervals; and
the processor is configured, via execution of the neural network instructions, to apply the flow state prediction to the recurrent neural network such that the assessment is based on the flow feature data and the flow state prediction.

19. The system of claim 18, wherein the processor is configured, via execution of the neural network instructions, to provide the flow state prediction at both input and output ends of the recurrent neural network.

20. The system of claim 18, wherein the processor is configured, via execution of the filter instructions, to update a plurality of system parameters indicative of dynamics of the flow system, the flow state prediction comprising data specifying the plurality of system parameters.

21. The system of claim 18, wherein:
the processor is configured, via execution of the filter instructions, to determine future flow feature data for the flow system for the following time interval; and
the future flow feature data comprises data indicative of flux for the following time interval and data indicative of density for the following time interval.

22. The system of claim 18, wherein the processor is configured, via execution of the filter instructions, to implement a Kalman filter configured in accordance with dynamics of the flow system.

23. A method for detecting an abnormality in a flow system, the method comprising:
obtaining, with a processor, input flow data for the flow system over a series of time intervals, each time interval of the series of time intervals having a unit of minutes, the series of time intervals extending over a number of days;
sequentially processing, with the processor, the input flow data to generate, for each time interval in the series of time intervals, flow feature data, the flow feature data being representative of a plurality of flow parameters for the input flow data at the time interval in the series of time intervals;
analyzing, with the processor, the flow feature data to provide an assessment for each time interval in the series of time intervals as to whether the input flow data is indicative of the abnormality being present in a following time interval in the series of time intervals; and
providing, with the processor, output data indicative of the assessment;
wherein the plurality of flow parameters comprises an external force applied to the flow system; and
wherein providing the output data comprises generating an alert when the input flow data is indicative of the abnormality being present in the following time interval; and
wherein analyzing the flow feature data comprises:
providing the flow feature data as a time series of inputs to recurrent neural network;
processing, by the recurrent neural network, the time series of inputs with each flow parameter of the plurality of flow parameters being an input feature of the recurrent neural network; and
configuring the recurrent neural network in a training stage as a classifier, the classifier comprising an input layer in which the time series of inputs are received, and a reservoir layer that applies transformations to the time series of inputs received at the input layer, the reservoir layer comprising a set of readout weights and a bias term, wherein configuring the recurrent neural network comprises optimizing the set of readout weights and the bias term during the training stage such that a loss factor between predicted and target classifications is minimized over a number of training days of training data.

24. The method of claim 23, wherein the recurrent neural network is an echo state network.

* * * * *